US012670625B2

(12) United States Patent
Oh et al.

(10) Patent No.: US 12,670,625 B2
(45) Date of Patent: Jun. 30, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 500 days.

(21) Appl. No.: 18/017,760

(22) PCT Filed: Aug. 12, 2021

(86) PCT No.: PCT/KR2021/010721
§ 371 (c)(1),
(2) Date: Jan. 24, 2023

(87) PCT Pub. No.: WO2022/035250
PCT Pub. Date: Feb. 17, 2022

(65) Prior Publication Data
US 2023/0316584 A1 Oct. 5, 2023

(30) Foreign Application Priority Data
Aug. 12, 2020 (KR) ........................ 10-2020-0101302

(51) Int. Cl.
*G06T 9/00* (2006.01)
*G06T 17/00* (2006.01)
(Continued)

(52) U.S. Cl.
CPC .............. *G06T 9/001* (2013.01); *G06T 17/00* (2013.01); *G06V 10/761* (2022.01); *H04N 19/96* (2014.11)

(58) Field of Classification Search
CPC ......... G06T 9/001; G06T 17/00; G06T 9/004; G06T 15/08; G06T 9/40; G06T 9/008;
(Continued)

(56) References Cited

U.S. PATENT DOCUMENTS

| | | | |
|---|---|---|---|
| 2019/0080483 A1* | 3/2019 | Mammou et al. ........ | G06T 9/40 |
| 2020/0105025 A1* | 4/2020 | Yea et al. .................. | G06T 9/40 |

(Continued)

FOREIGN PATENT DOCUMENTS

KR 10-2020-0065076 A 6/2020

OTHER PUBLICATIONS

Khaled Mammou et al., "G-PCC codec description v2", ISO/IEC JTC1/SC29/WG11 N18189, Jan. 2019, Marrakech, MA.

*Primary Examiner* — Matthew C Bella
*Assistant Examiner* — Daniel J. Santos
(74) *Attorney, Agent, or Firm* — Bryan Cave Leighton Paisner LLP

(57) ABSTRACT
A point cloud data transmission method according to embodiments may comprise the steps of: encoding point cloud data; and transmitting a bitstream including the point cloud data. A point cloud data reception device according to embodiments may comprise: a receiver which receives a bitstream including point cloud data; and a decoder which decodes the point cloud data.

20 Claims, 35 Drawing Sheets

(51) Int. Cl.
_G06V 10/74_ (2022.01)
_H04N 19/96_ (2014.01)

(58) Field of Classification Search
CPC ...... G06T 15/00; G06V 10/761; G06V 20/64;
G06V 10/00; G06V 20/00; H04N 19/96;
H04N 19/597
See application file for complete search history.

(56) References Cited

U.S. PATENT DOCUMENTS

| | | | |
|---|---|---|---|
| 2020/0107048 A1* | 4/2020 | Yea et al. ............... | H04N 19/96 |
| 2020/0153885 A1 | 5/2020 | Lee et al. | |
| 2020/0302651 A1* | 9/2020 | Flynn et al. .............. | G06T 9/20 |
| 2021/0104075 A1* | 4/2021 | Mammou et al. ...... | G06T 9/001 |
| 2022/0292723 A1* | 9/2022 | Wan et al. .............. | G06T 9/001 |
| 2022/0385928 A1* | 12/2022 | Ricard et al. .......... | H04N 19/30 |
| 2023/0196625 A1* | 6/2023 | Li et al. ................... | G06T 9/00 |

\* cited by examiner $$1 + 2 + 4 + 8 = 15$$

Level of details

L1 norm :   $E_g = |G(n)\text{-}G(m)| = w_x|x_n\text{-}x_m| + w_y|y_n\text{-}y_m| + w_z|z_n\text{-}z_m|$ L1 norm :   $E_g = |G(n)\text{-}G(m)| = w_x|x_n\text{-}x_m|^2 + w_y|y_n\text{-}y_m|^2 + w_z|z_n\text{-}z_m|^2$ Distance :   $E_g = |G(n)\text{-}G(m)| = \sqrt{w_x|x_n\text{-}x_m|^2 + w_y|y_n\text{-}y_m|^2 + w_z|z_n\text{-}z_m|^2}$ Ratio :   $E_g = |G(n)\text{-}G(m)| = w_x|x_n/x_m| + w_y|y_n/y_m| + w_z|z_n/z_m|$ 18000 — $P(n):A(n) = [r_n, g_n, b_n, R_n]$ L1 norm:    $E_a = |A(n)-A(m)| = w_r|r_n-r_m| + w_g|g_n-g_m| + w_b|b_n-b_m| + w_R|R_n-R_m|$ L1 norm:    $E_a = |A(n)-A(m)| = w_r|r_n-r_m|^2 + w_g|g_n-g_m|^2 + w_b|b_n-b_m|^2 + w_R|R_n-R_m|^2$

18010

Distance:    $E_a = |A(n)-A(m)| = \sqrt{w_r|r_n-r_m|^2 + w_g|g_n-g_m|^2 + w_b|b_n-b_m|^2 + w_R|R_n-R_m|^2}$ $E_a = |A(n)-A(m)| = \sqrt{w_r|r_n-r_m|^2 + w_g|g_n-g_m|^2 + w_b|b_n-b_m|^2 + w_R|R_n-R_m|}$ Ratio:    $E_a = |A(n)-A(m)| = w_r|r_n/r_m| + w_g|g_n/g_m| + w_b|b_n/b_m| + w_R|R_n/R_m|$

FIG. 19

$$A'(n) = A(k) \text{ wher } k = \text{argmin } |G(n)\text{-}G(l)| \qquad 19000$$

$$A'(n) = \sum_{NN} w_k A(k) \text{ wher } NN = \text{nerarest neighbors} \qquad 19010$$

$$A'(n) = A(k) \text{ wher } P(k) = \text{parent of } P(n) \qquad 19020$$

$$M(n) \gg 2 \times \text{num}_{LoD} = M(k) \gg 3 \times \text{num}_{LoD} \qquad 19030$$

$E_a = |A(n) - A'(m)|$ wher A and A'(m) represents attribute of correlated and neighbor point $E_a = |A(n) - A'(m)|$ wher A'(m) represents attribute of correlated point of neighbor points

FIG. 25

$25000 \sim\!\!- E = w_g E_g + w_a E_a$ $$25010 \begin{cases} E_a = \sqrt{(r_2 - r_1)^2 + (g_2 - g_1)^2 + (b_2 - b_1)^2} \\ E_a = \sqrt{(L_2 - L_1)^2 + (a_2^* - a_1^*)^2 + (b_2^* - b_1^*)^2} \end{cases}$$

FIG. 26

$$\text{Neighbour} = \{P(k): th1 \leq E_a \leq th2\} \quad \sim\!\!-\!26000$$

FIG. 28

| attribute_parameter_set( ) { | Descriptor |
|---|---|
| .... | |
|     neighbour_search_attr_correlation_enabled_flag | u(1) |
|     if( neighbour_search_attr_correlation_enabled_flag ){ | |
|       attr_correlation_type  // thres, | u(4) |
|       if( attr_correlation_type == 0 ) {　　　// thresholding | |
|         th1_lower_bound | u(8) |
|         th2_upper_bound | u(8) |
|       } | |
|       else if ( attr_correlation_type == 1 ) {　　// weighted error | |
|         weight_geom | u(8) |
|         weight_attr1 | u(8) |
|         weight_attr2 | u(8) |
|       } | |
|   } | |
|   .... | |

FIG. 29

| attribute_slice_header( ) { | Descriptor |
|---|---|
|     .... | |
|     neighbour_search_attr_correlation_enabled_flag | u(1) |
|     if( neighbour_search_attr_correlation_enabled_flag ){ | |
|       attr_correlation_type  // thres, | u(4) |
|       if( attr_correlation_type == 0 ) {       // thresholding | |
|         th1_lower_bound | u(8) |
|         th2_upper_bound | u(8) |
|       } | |
|       else if ( attr_correlation_type == 1 ) {    // weighted error | |
|         weight_geom | u(8) |
|         weight_attr1 | u(8) |
|         weight_attr2 | u(8) |
|       } | |
|   } | |
|     .... | |

(a)                                    (b)

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

This application is a National Phase application under 35 U.S.C. 371 of International Application No. PCT/KR2021/010721, filed on Aug. 12, 2021, which claims the benefit of Korean Application No. 10-2020-0101302, filed on Aug. 12, 2020, the contents of which are incorporated by reference herein in their entirety.

TECHNICAL FIELD

Embodiments relate to a method and device for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, as embodied and broadly described herein, a method for transmitting point cloud data may include encoding the point cloud data, and transmitting a bitstream containing the point cloud data.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 17 illustrates estimation of a geometry difference according to embodiments;

FIG. 19 illustrates estimation of a correlated point according to embodiments;

FIG. 25 illustrates an example of using a weight to obtain the sum of errors according to embodiments;

FIG. 26 illustrates an example of using a threshold according to embodiments;

FIG. 28 shows an attribute parameter set according to embodiments;

FIG. 29 shows an attribute slice header according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
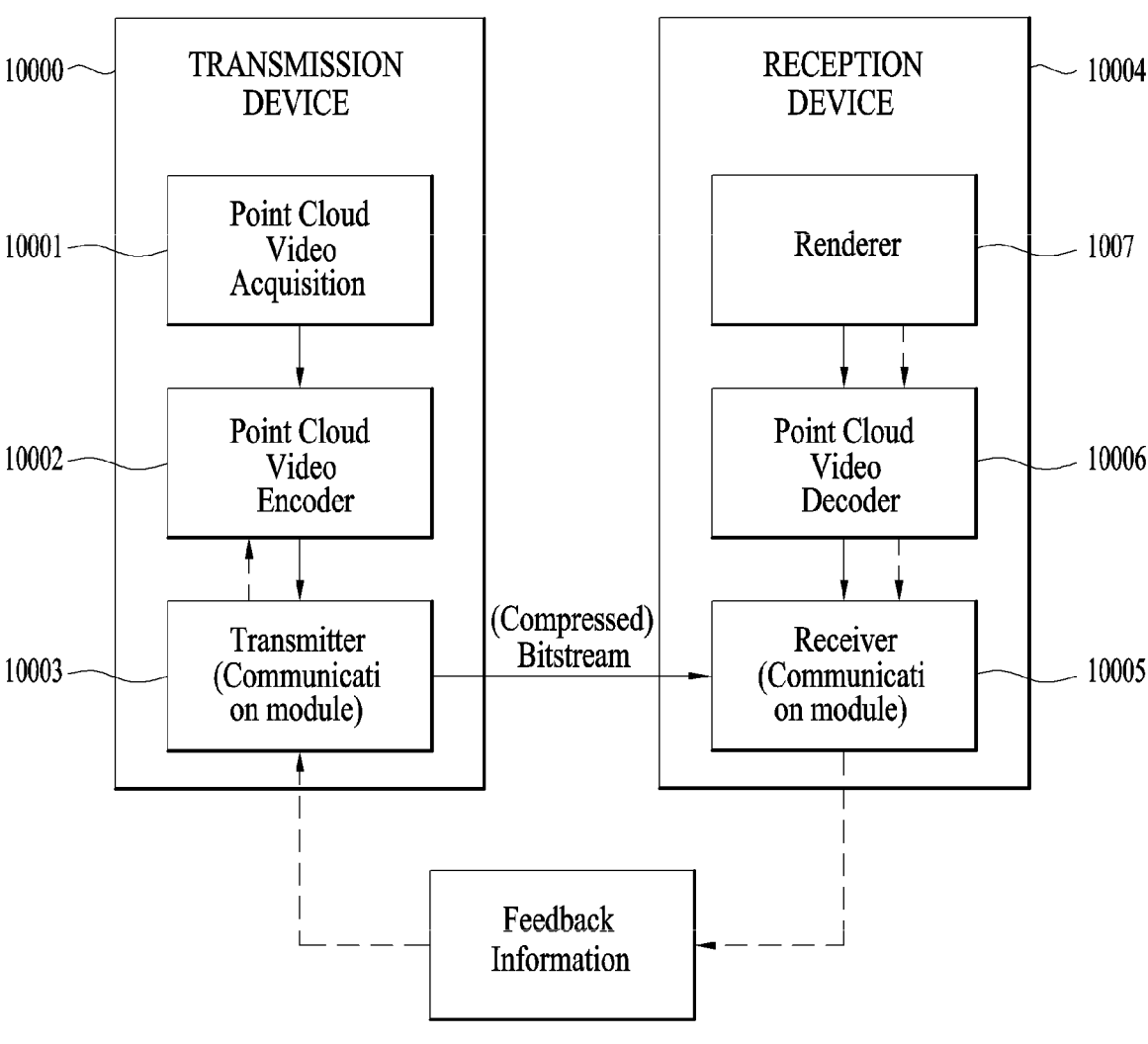
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bit-stream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
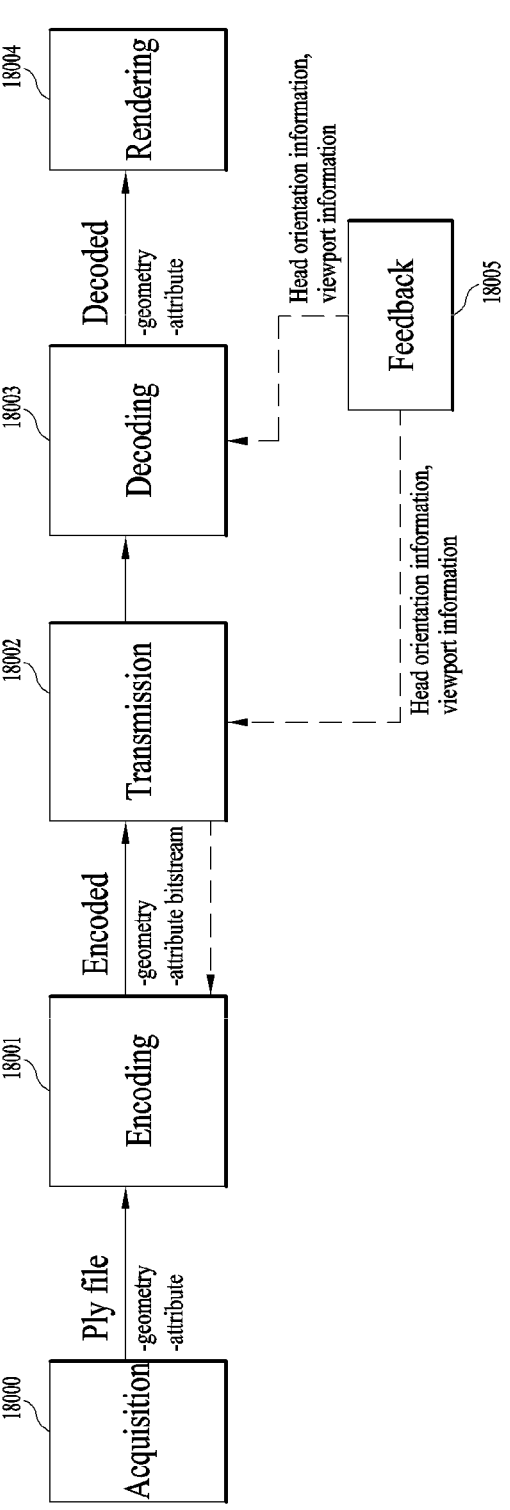
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
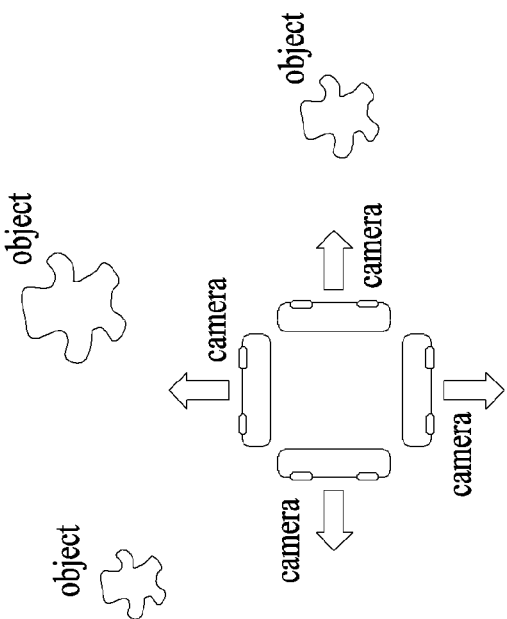
FIG. 3 illustrates an exemplary process of capturing a point cloud video according to embodiments.
Figure 3:
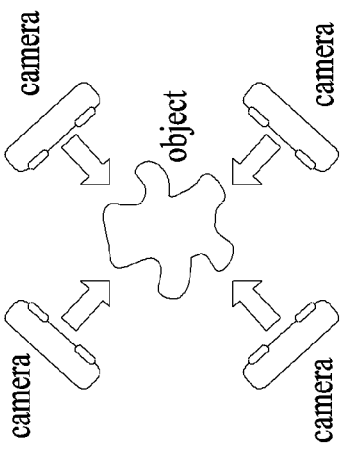

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
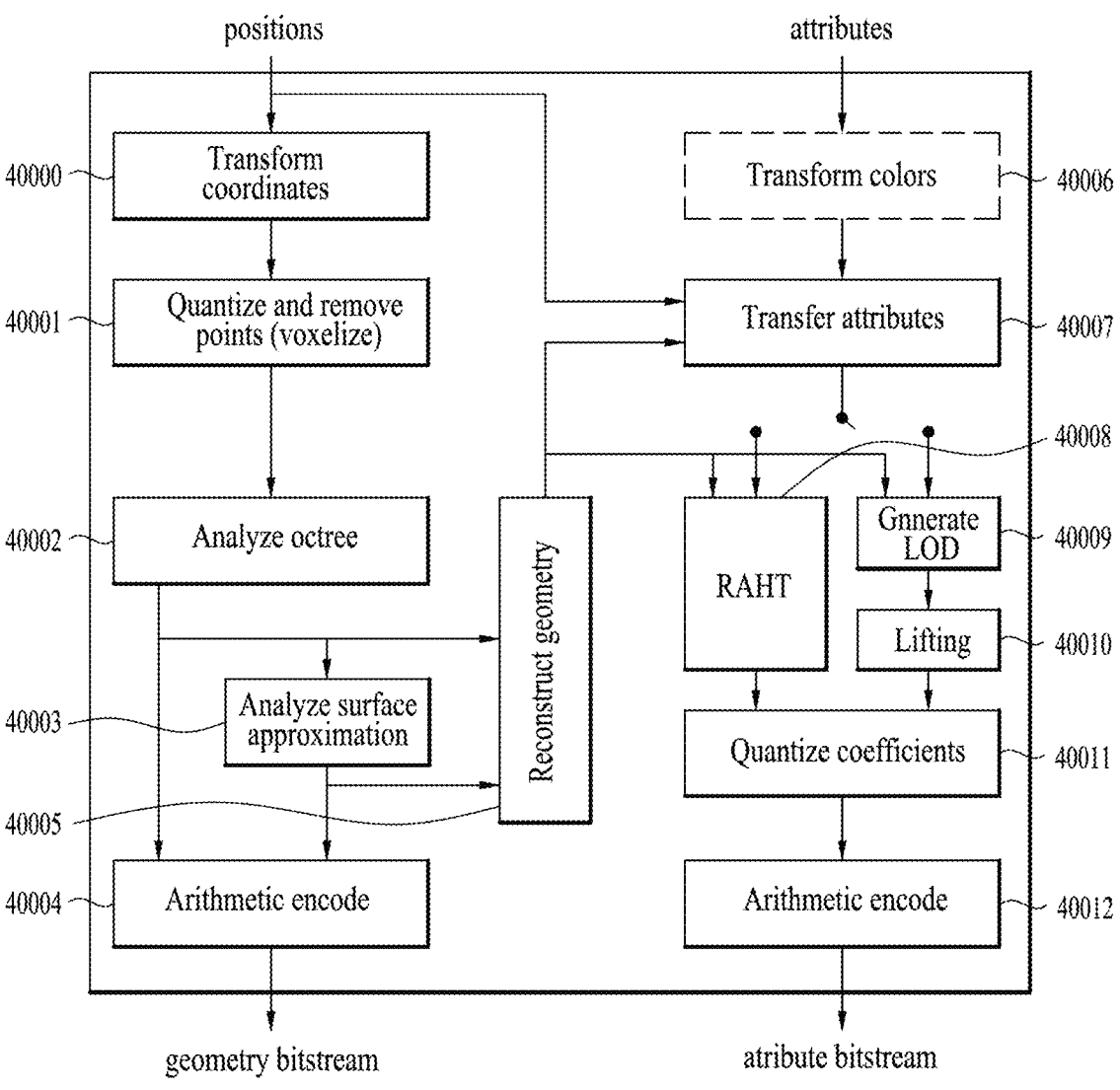
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
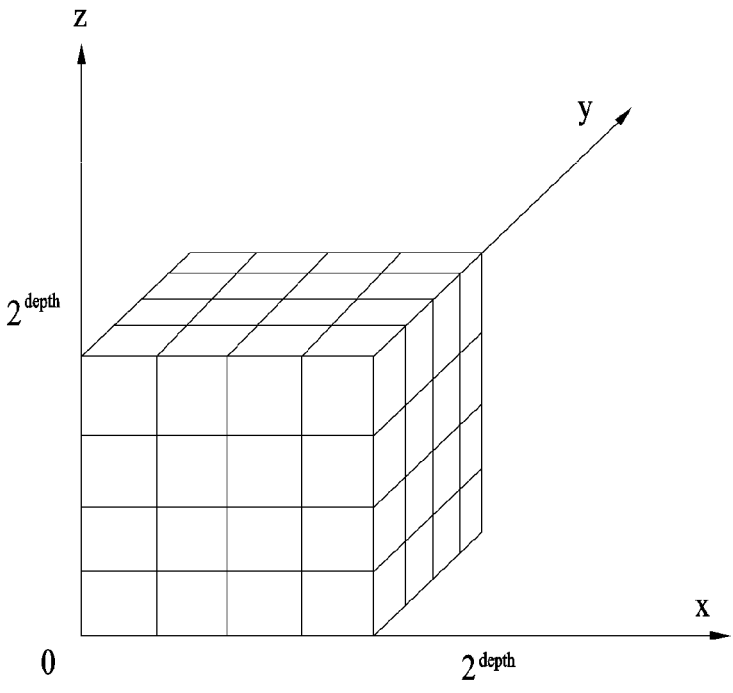
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
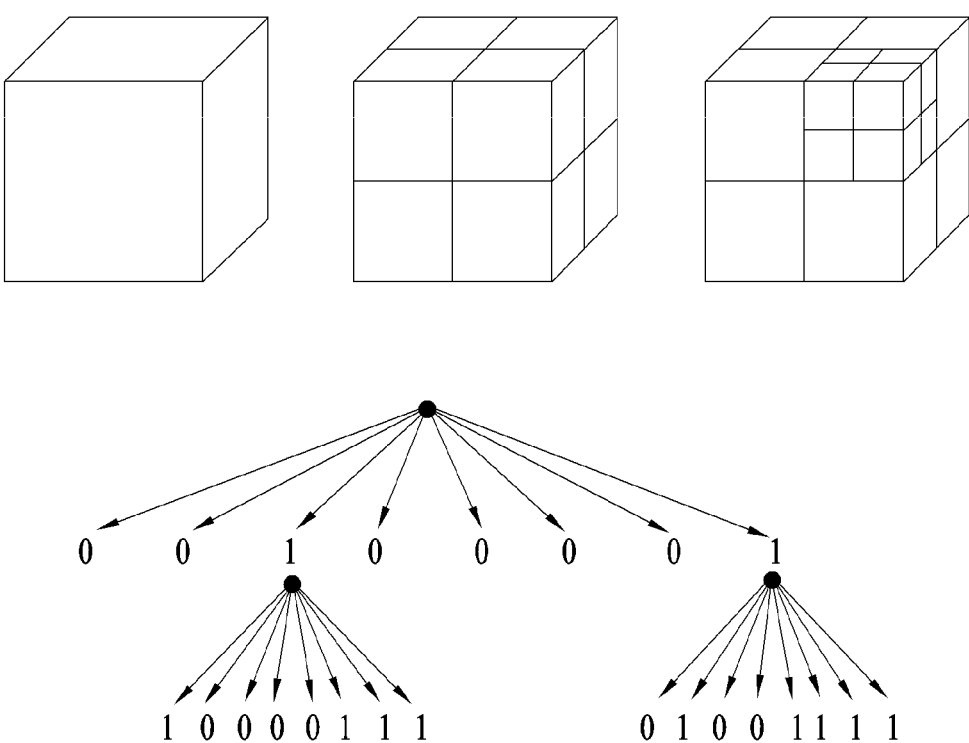
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = \text{Ceil}\left(\text{Log2}\left(\text{Max}\left(x^{int}_n, y^{int}_n, z^{int}_n, n = 1, \dots, N\right) + 1\right)\right)$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta$x, $\Delta$y, $\Delta$z) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix} ; \qquad \text{i)}$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} ; \qquad \text{ii)}$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \qquad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

| n | triangles |
|---|---|
| | Triangles formed from vertices ordered 1, . . . , n |
| 3 | (1, 2 ,3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

Figure 7:
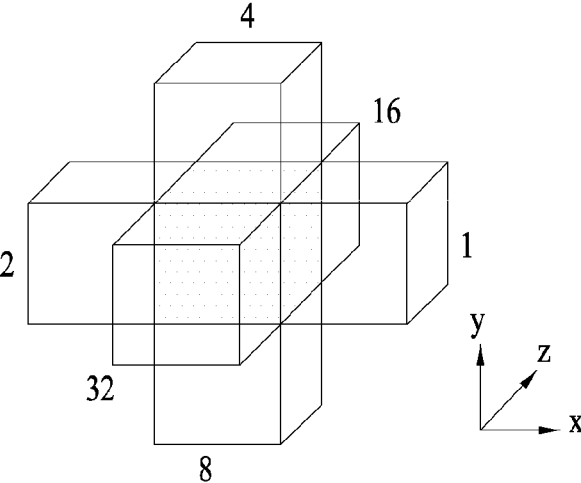
FIG. 7 shows an example of a neighbor node pattern according to embodiments.
Figure 7:
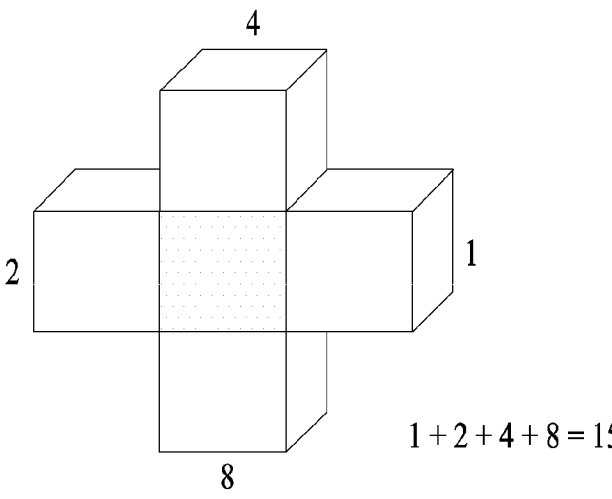

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
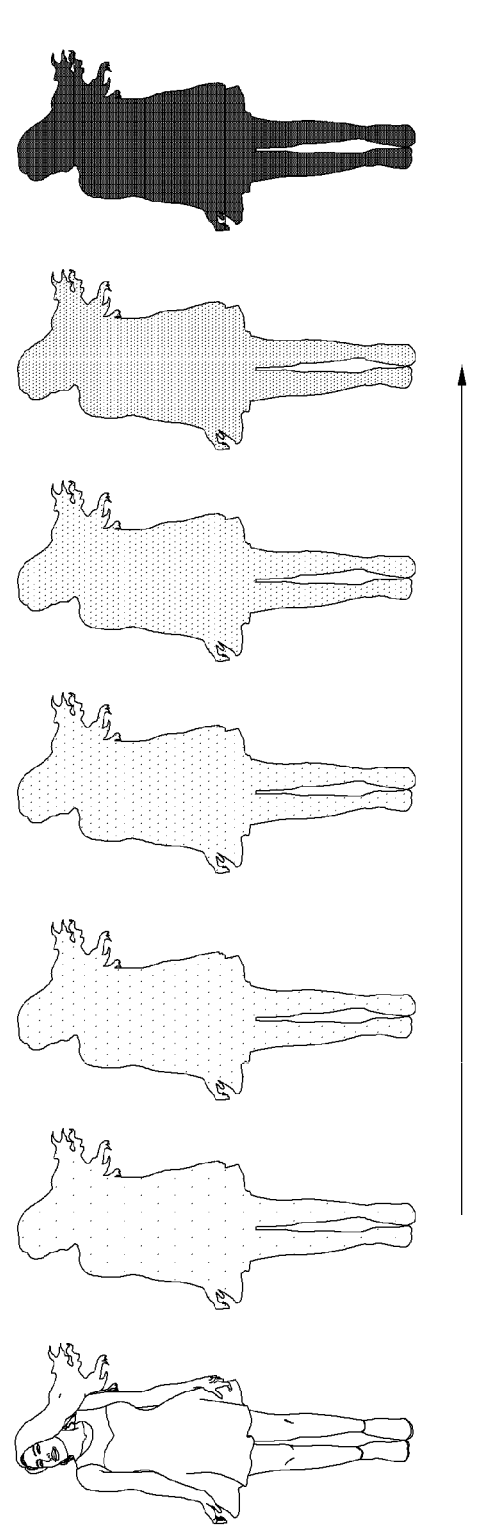
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
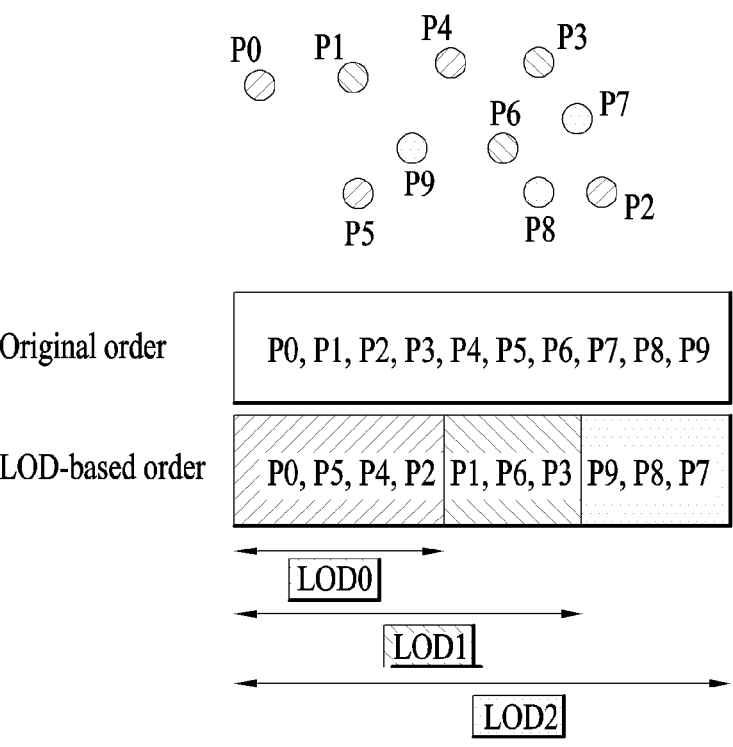
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE

```
Attribute prediction residuals quantization pseudo code
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE

```
Attribute prediction residuals inverse quantization pseudo code
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}g_{l+1_{2x,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1\ w2} \begin{bmatrix} g_{l_{2x,y,z}} \\ g_{l_{2x+1,y,z}} \end{bmatrix},$$

$$T_{w1\ w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000\ w1001} \begin{bmatrix} g_{1_{0,0,0z}} \\ g_{1_{0,0,1}} \end{bmatrix}$$

Figure 10:
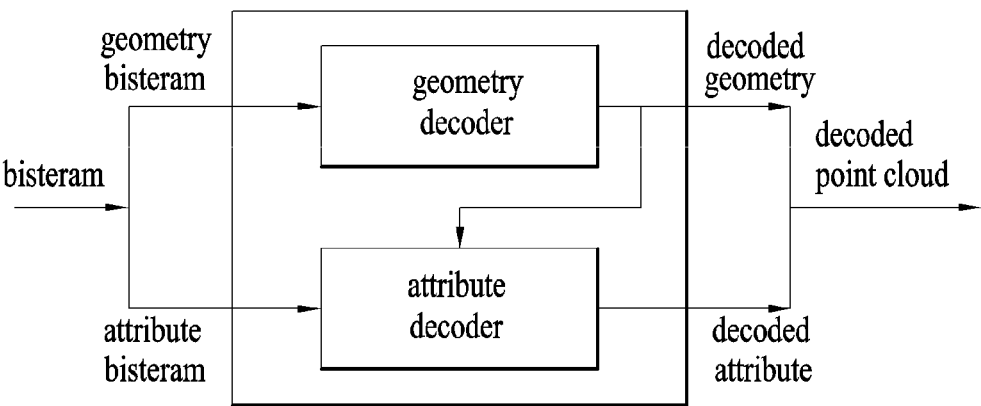
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
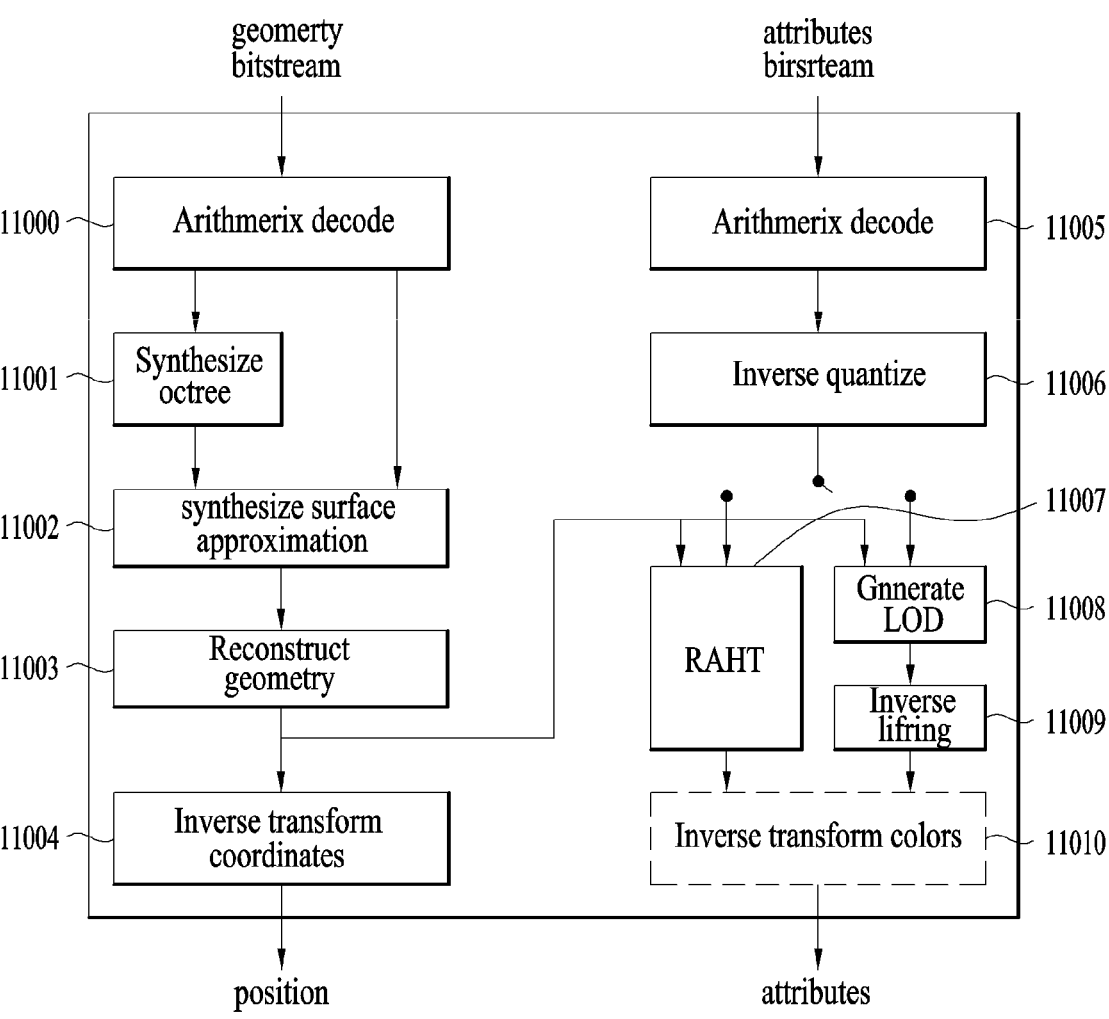
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
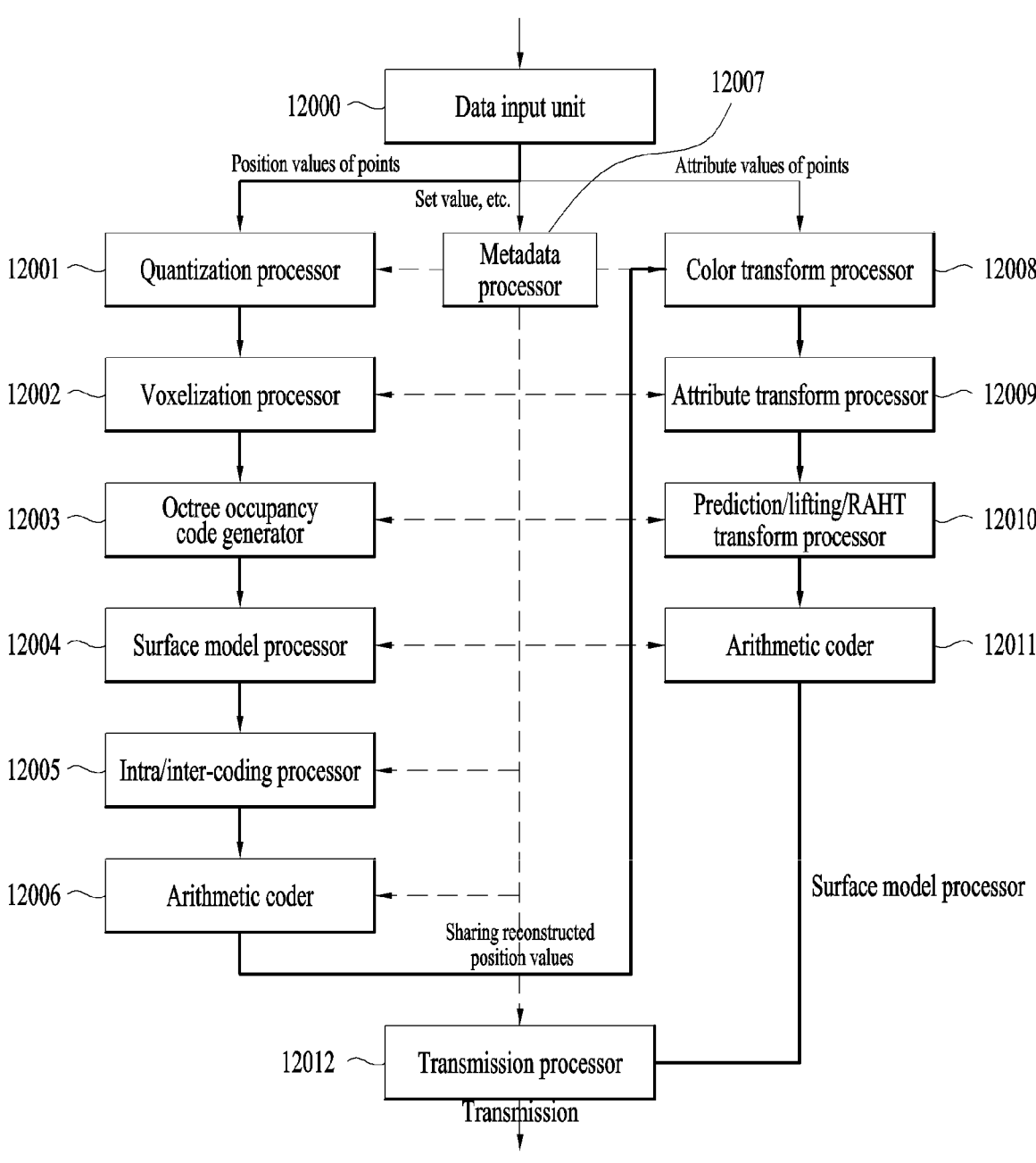
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
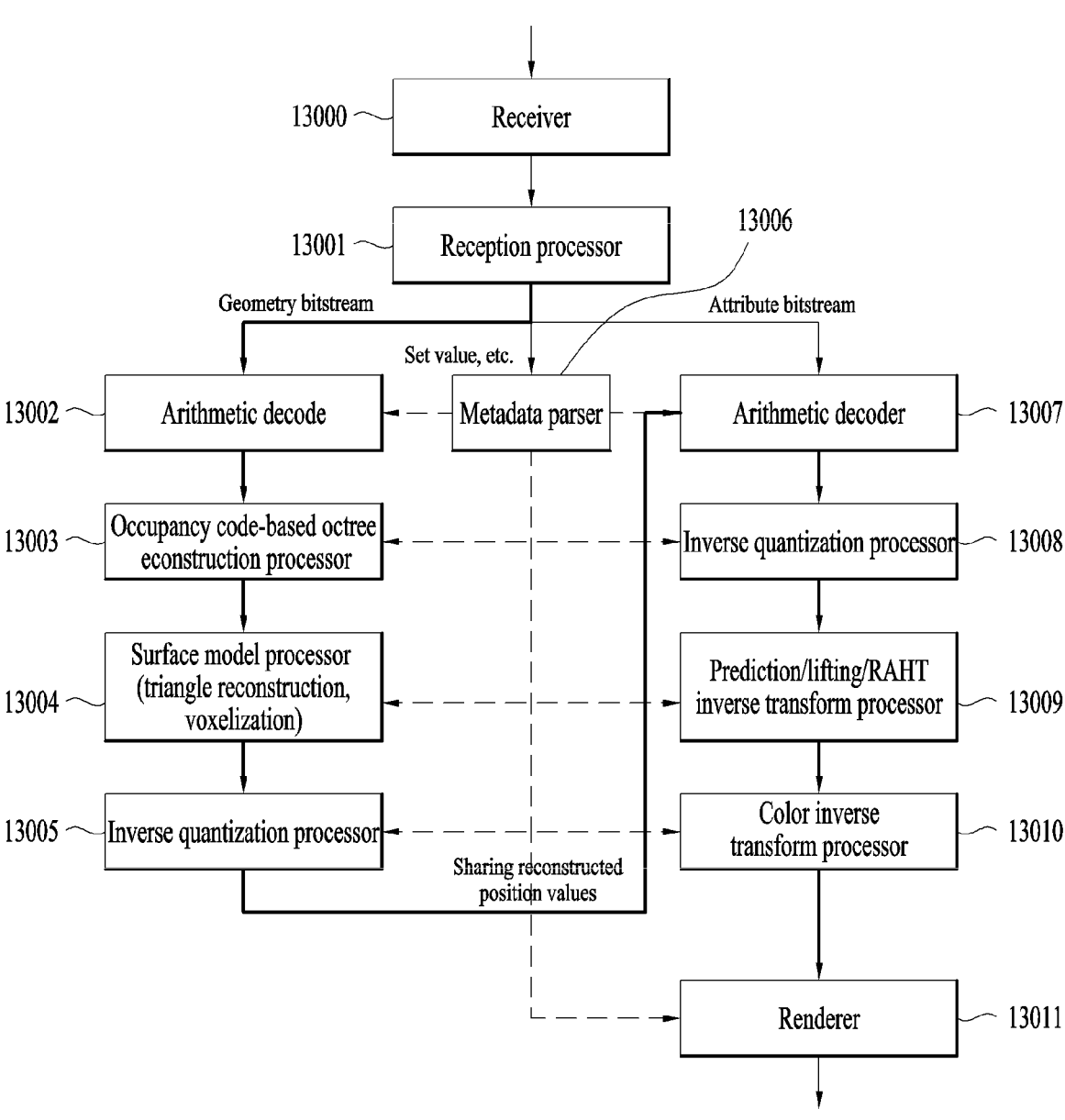
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the recon-structed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
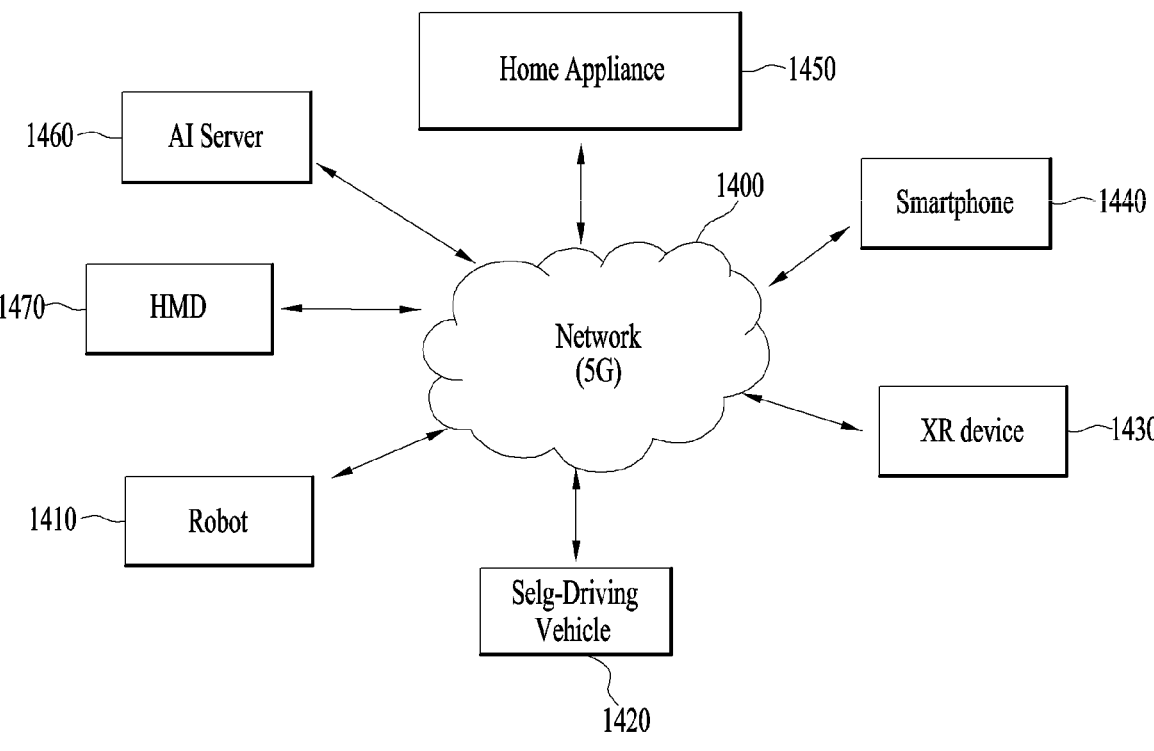
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile phone>

The XR/PCC device 1430 may be implemented as a mobile phone 1440 by applying PCC technology.

The mobile phone 1440 may decode and display point cloud content based on the PCC technology.

<PCC+Self-driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 20:
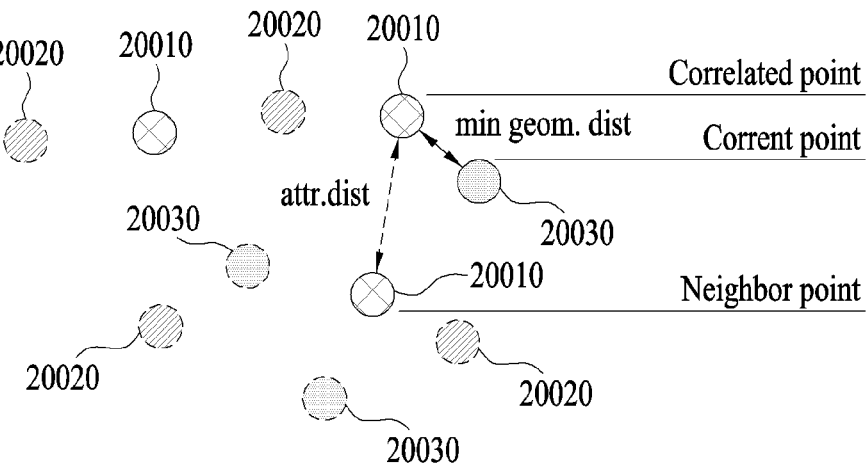
FIG. 20 illustrates illustrates estimation of an attribute difference based on a correlated point according to embodiments.
Figure 22:
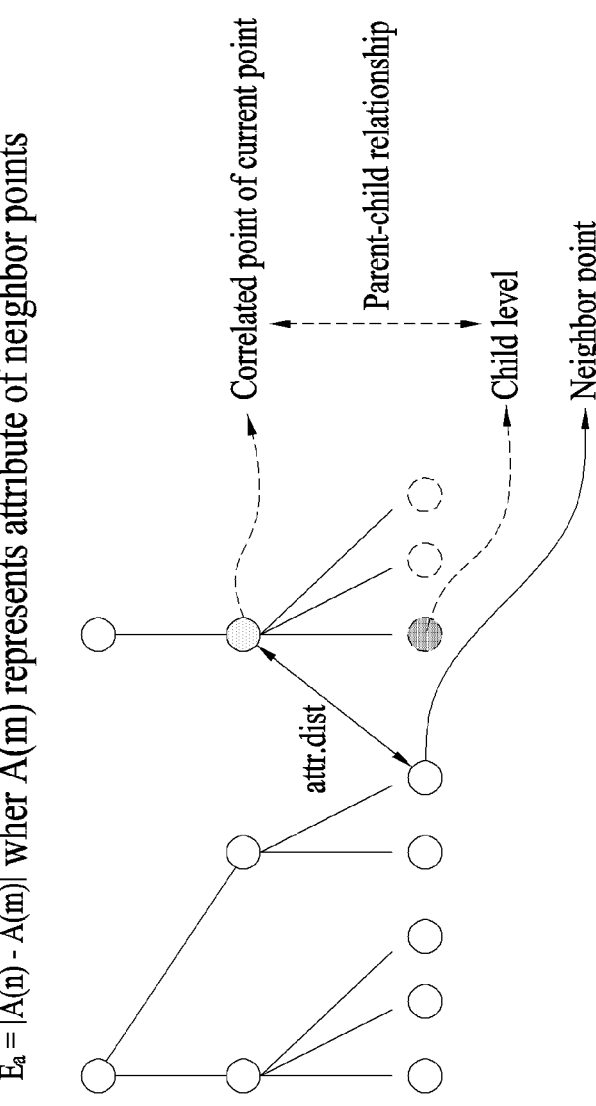
FIG. 22 illustrates a neighbor point-based estimation of an attribute difference according to embodiments.

The point cloud data transmission method/device according to embodiments may be construed as a term referring to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoding process of FIGS. 20 and 22, and the like.

Figure 21:
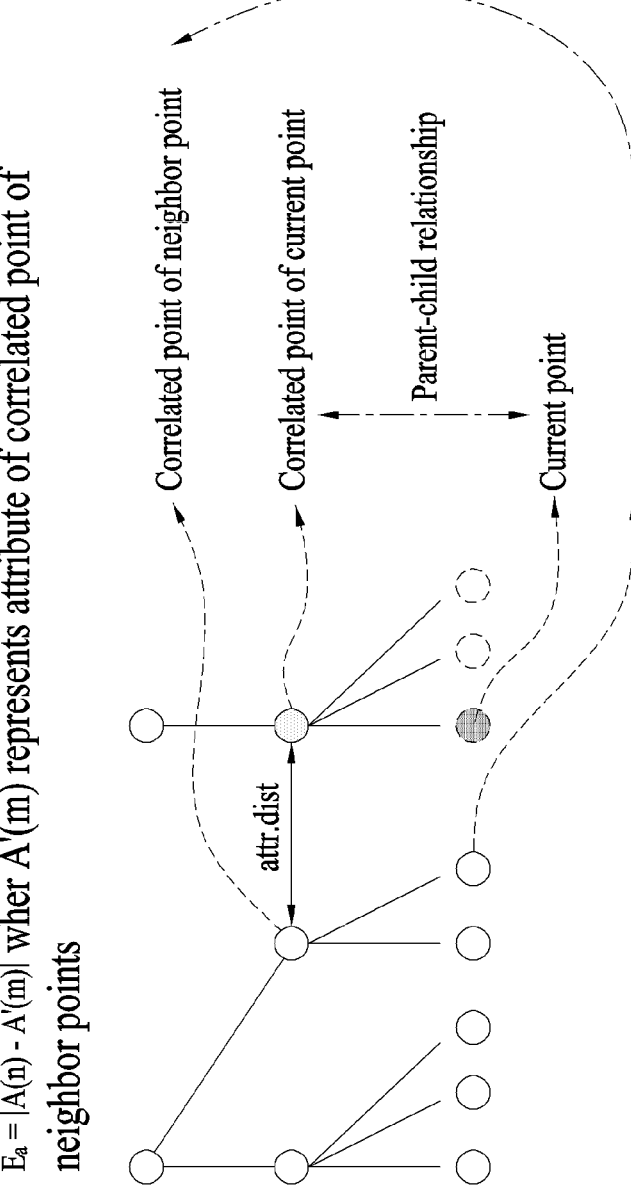
FIG. 21 illustrates estimation of a parent-child-based correlated point.
Figure 23:
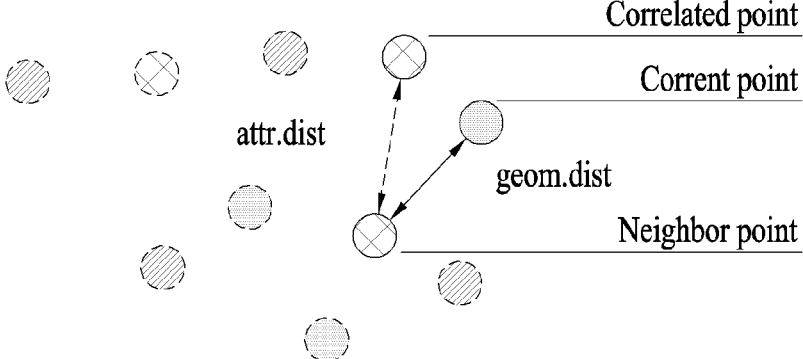
FIG. 23 illustrates a neighbor search based on geometry and attributes according to embodiments.

The point cloud data reception method/device according to embodiments may be construed as a term referring to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoding process of FIGS. 21 and 23, and the like.

The method/device for transmitting or receiving point cloud data according to the embodiments may be referred to simply as a method/device.

According to embodiments, geometry data, geometry information, and position information constituting point cloud data are to be construed as having the same meaning. Attribute data, attribute information, and attribute information constituting the point cloud data are to be construed as having the same meaning.

Figure 15:
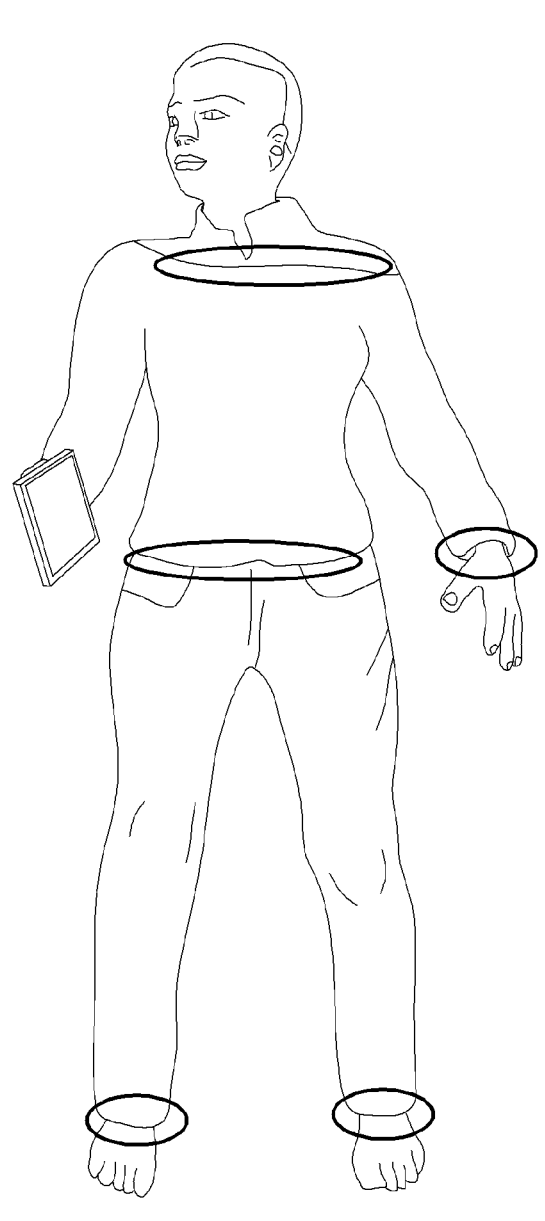
FIG. 15 illustrates an example of an object related to point cloud data according to embodiments.

FIG. 15 illustrates an example of an object related to point cloud data according to embodiments.

The point cloud data processed by the method/device according to the embodiments may represent data acquired from the object of FIG. 15.

The method/device according to embodiments may search for neighbor points based on attribute similarity from the point cloud data of FIG. 15 to compress and reconstruct the point cloud data.

As a method for efficiently compressing and providing a service related to the point cloud data, an attribute coding method may be used. In this case, a neighbor node used for attribute coding is defined based on position information. By using attribute information, prediction accuracy may be further improved.

Embodiments provide a technique for compressing data into a point cloud, as shown in FIG. 15. Specifically, as a method for efficiently compressing attribute information, a method of more accurately finding a neighbor node is proposed.

Point cloud data is composed of position (geometry: e.g., XYZ coordinates) and attribute (eg, color, reflectance, etc.)

information related to each datum. Methods for compressing the position information and attribute information are being studied for efficient compression. In compressing the position information, an octree-based compression method is used and then attribute information is compressed based on the compressed data. In compressing the attribute information, a method of predicting an attribute based on information about a neighbor node may be used. In this case, a neighbor node may be selected based on the position. In predicting the attribute of a point to be compressed based on the attributes of neighbor nodes, it is assumed that the attributes of position-based adjacent points are highly correlated with the attribute of the current position. However, for points for which this assumption is not valid, compression efficiency may be degraded.

Attribute coding is performed based on position information. In some cases, there may be cases where the attribute similarity of position-based neighbor nodes may be low. For example, in the case of LoD-based attribute compression, the attribute of a target point is predicted based on points belonging to a higher LoD, and prediction performance may be determined by attribute similarity to neighbor nodes. That is, in a flat region in which the attributes do not change significantly within a unit space, the attributes of the points positioned at a near distance are highly likely to be similar to the attribute of a point at the target position to be predicted, and therefore the prediction accuracy is high. However, when the attribute changes greatly within the unit space, such as the region boundary in the example below, there is a possibility that the attribute of the point position at the near distance is different from the attribute of the point at the target position to be predicted, and therefore the prediction accuracy is highly likely to be significantly reduced.

Embodiments include a method considering the position and attributes in defining a neighbor node for attribute compression. For example, embodiments may include operations such as 1) defining a correlated point for estimation of the attribute of a position to be compressed and 2) defining a method for determining attribute similarity.

Embodiments disclose an attribute compression method in which the attribute of a current point is predicted based on the attributes of neighbor points among attribute compression methods. For attribute compression, an attribute may be predicted based on the positions of neighbor points. To this end, a method for searching for neighbor nodes similar to a target point is important. When data is configured in layers, such as LoD, the target of the neighbor nodes may be a layer on which compression and reconstruction have been completed. Embodiments may be used not only for general point cloud compression but also for scalable point cloud compression. In addition, the method of prediction-based attribute compression according to the embodiments may be used independently of the position compression method, and may be used for position compression as well as attribute compression based on a method according to the embodiments. The LoD generation method according to the embodiments may be used not only for scalable coding applications but also for general point cloud compression.

Attribute encoding and/or decoding methods according to embodiments may include octree-based LoD generation, geometry difference estimation, attribute difference estimation, and geometry and attribute based neighbor search. In the following, each embodiment is described.

Octree-Based LoD Generation

As shown in FIG. 9, LoD generation may be used in attribute encoding/decoding. LoD stands for Level of Detail, and LoDs are configured such that the density of points increases as LoD increases. In this regard, whether to include LoD k is determined based on the distance to the neighbor node.

Figure 16:
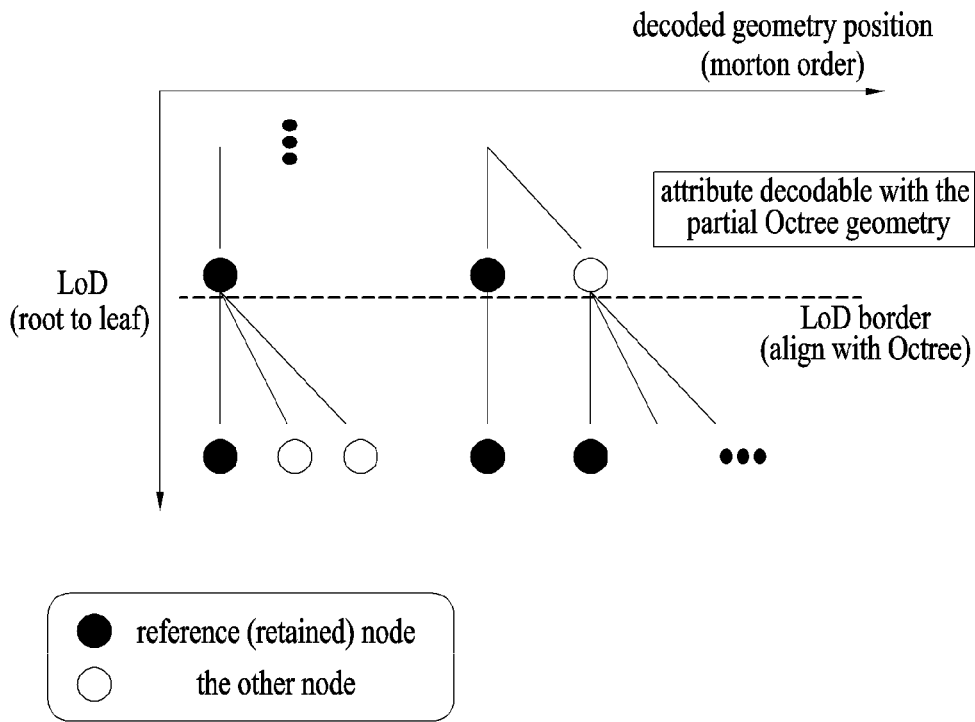
FIG. 16 illustrates scalable attribute coding according to embodiments.

FIG. 16 illustrates scalable attribute coding according to embodiments.

An attribute encoder/decoder according to embodiments may perform scalable attribute coding. Scalable coding refers to a technique of efficiently coding data using a feature of resolution that increases according to a depth of octree-based geometry coding. According to embodiments, various hierarchical tree structures may be used in addition to the octree.

As the octree is partitioned, the detail increases. At each depth, an attribute may be matched to an occupied node (which represents a node where a point is positioned). Thereby, the point cloud data may be scalably represented (scalable representation), and scalable encoding/decoding of the point cloud data may be implemented.

In the scalable attribute coding according to embodiments, LoD generation is performed based on an octree (or other trees), unit node-based selection, not classification by distance, may be performed. In this case, children having the same node as a parent may be defined as neighbors, and one attribute may be selected from among the neighbors and matched to the parent node.

Figure 17:
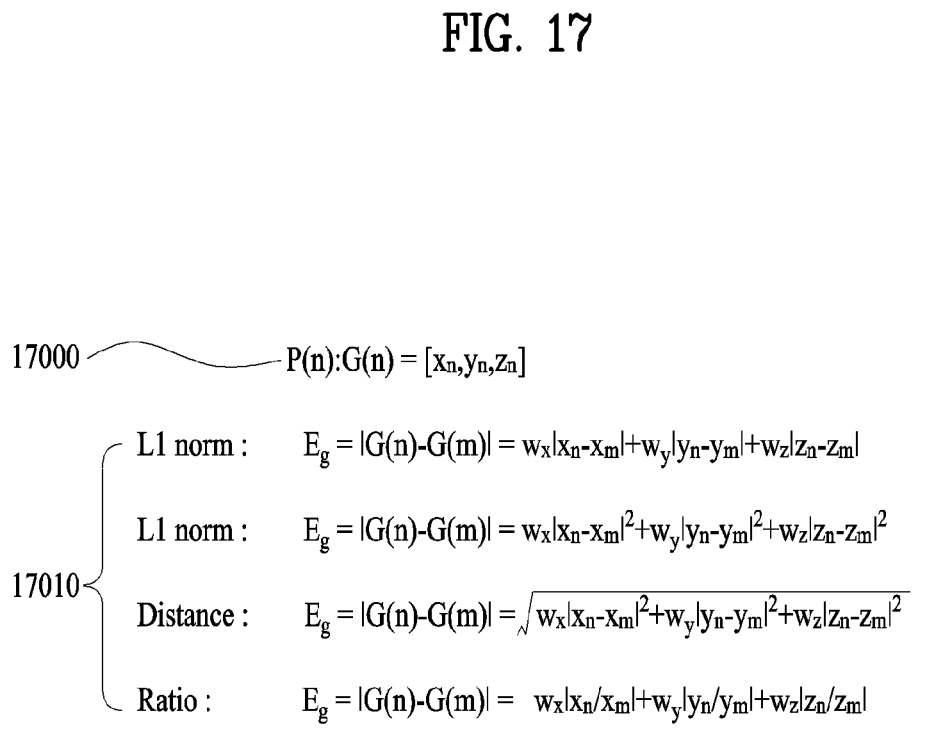

FIG. 17 illustrates estimation of a geometry difference according to embodiments.

Figure 30:
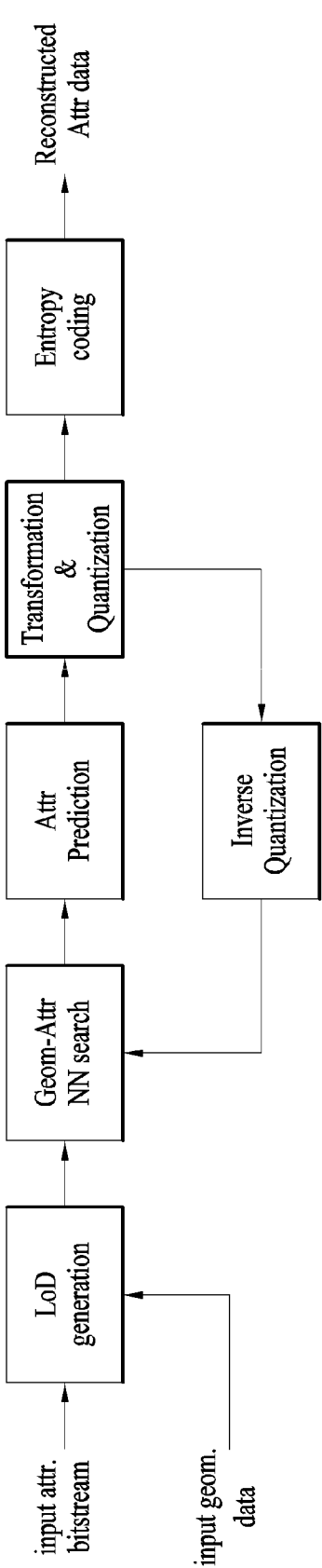
FIG. 30 illustrates a point cloud data encoder according to embodiments.
Figure 32:
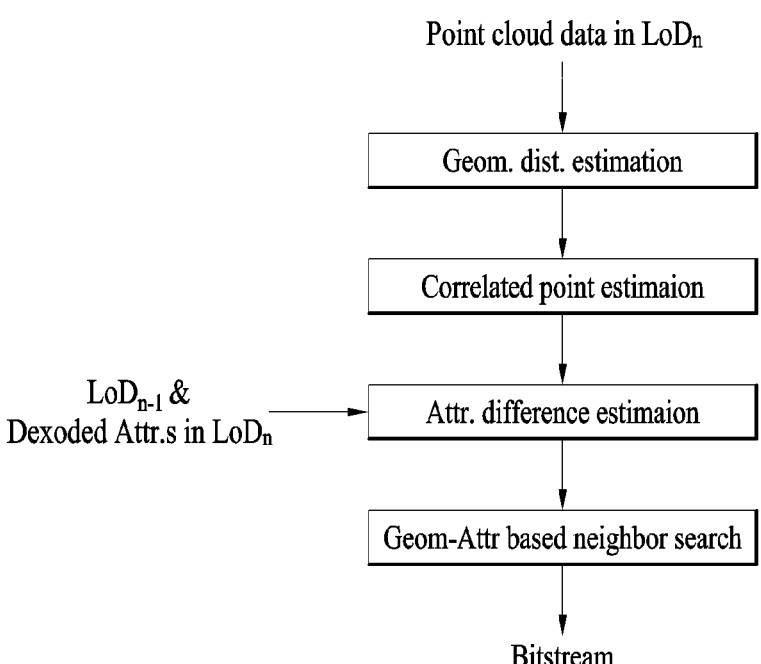
FIG. 32 illustrates a point cloud data encoding method according to embodiments.
Figure 33:
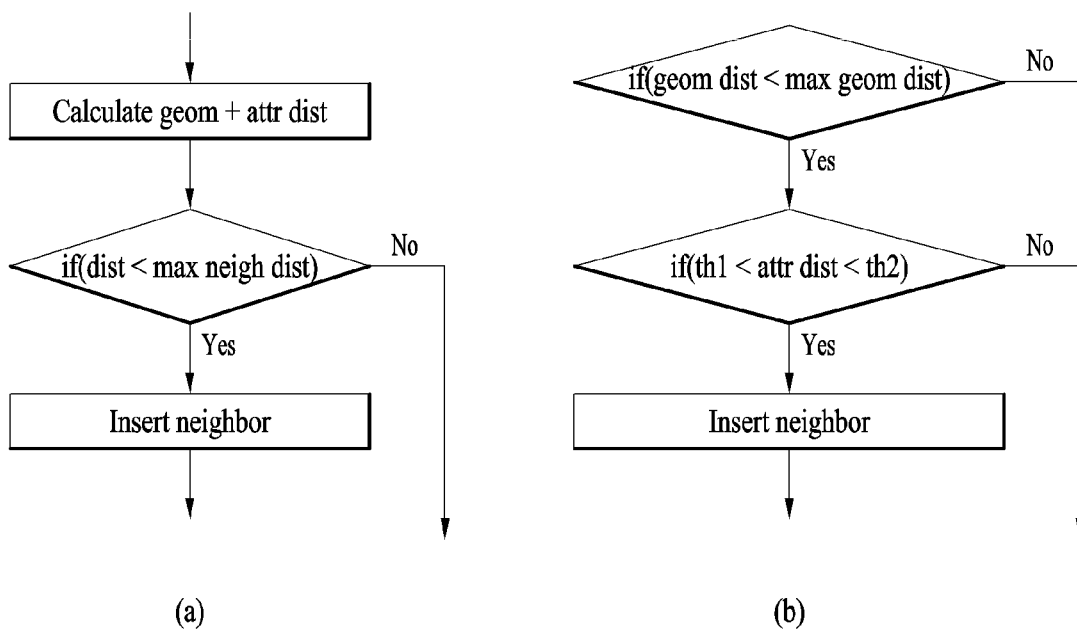
FIG. 33 illustrates a point cloud data encoding method according to embodiments.
Figure 34:
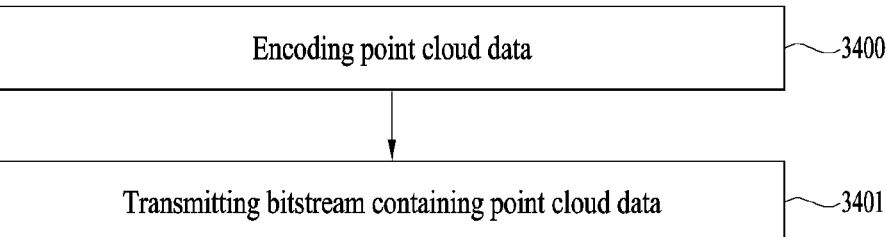
FIG. 34 illustrates a method of transmitting point cloud data according to embodiments.

The transmission device 10000 of FIG. 1, the point cloud video encoder 10002 of FIG. 1, the encoding 20001 of FIG. 2, the encoder of FIG. 4, the transmission device of FIG. 12, the XR device 1430 of FIG. 14, the attribute encoder of FIG. 30, the flowchart of FIG. 32, the flowchart of FIGS. 33 and 34, and the like may encode point cloud data based on the geometry difference estimation in FIG. 17.

Figure 31:
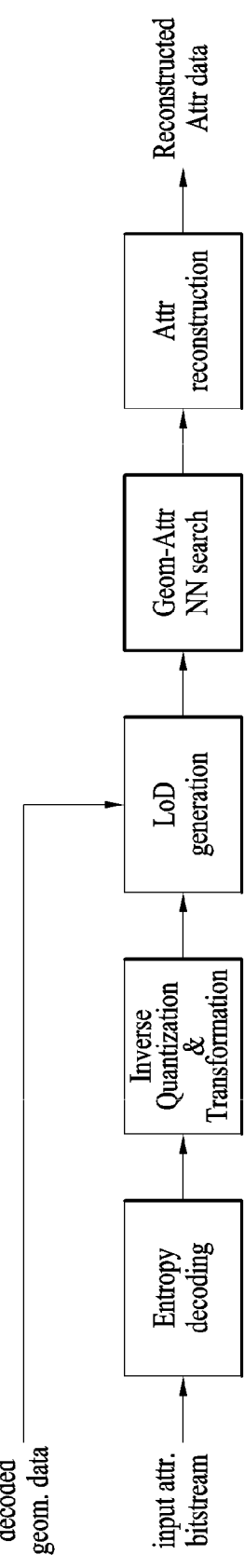
FIG. 31 illustrates a point cloud data decoder according to embodiments.
Figure 35:
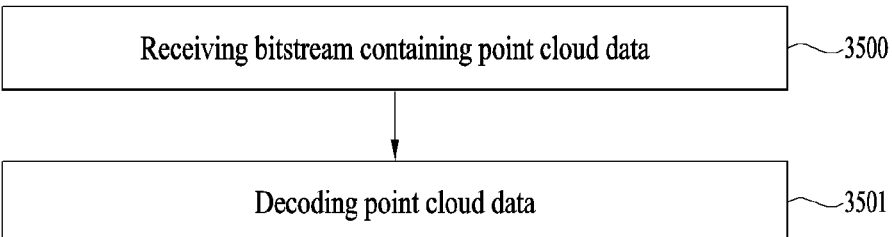
FIG. 35 illustrates a method of receiving point cloud data according to embodiments.

The reception device 10004 of FIG. 1, the point cloud video decoder 10006 of FIG. 1, the decoding 20003 of FIG. 2, the decoder of FIGS. 10 and 11, the reception device of FIG. 13, the XR device 1430 of FIG. 14, the attribute decoder of FIG. 31, and the flowchart of FIG. 35, and the like may decode the point cloud data based on the geometry difference estimation in FIG. 17.

Geometry Difference Estimation

For a point set, for example, a point set divided by LoD, neighbor points on the geometry of each point may be obtained. When the geometry of the n-th point $P(n)$ is $G(n)$, it may be expressed as 17000. While 17000 shows xyz position information as a general case, converted coordinates in a specific coordinate system, for example, cylindrical/sphere coordinates composed of radius, azimuthal angle, and elevation angle may be used depending on the application field.

Two points $P(n)$ and $P(m)$ may be compared in terms of distance similarity as 17010, where w may denote a weight for each component, and may be used to assign a greater weight to the main component.

As shown in FIG. 17, the method/device according to the embodiments may estimate the similarity between two points based on an L1 norm, an L2 norm, a distance, a ratio, and the like from the coordinates of the two points.

Figure 18:
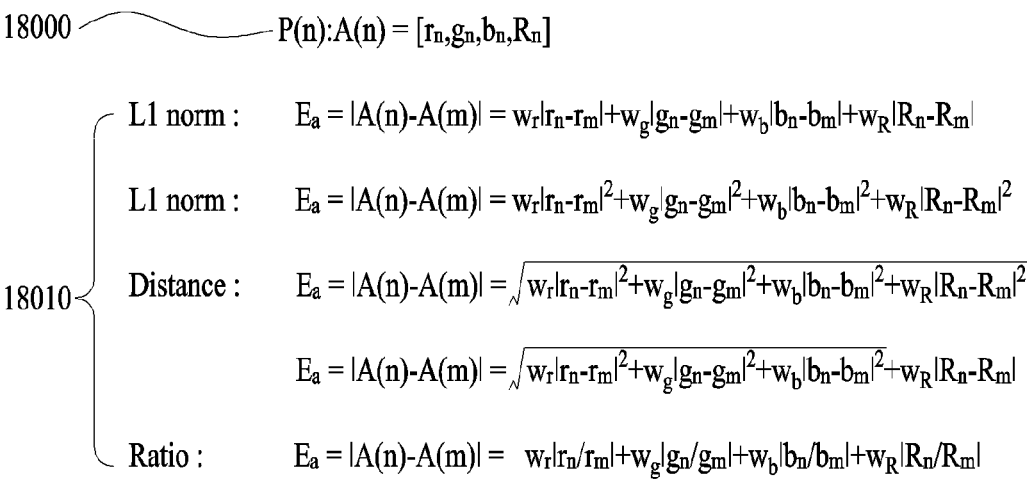
FIG. 18 illustrates estimation of an attribute difference according to embodiments.

FIG. 18 illustrates estimation of an attribute difference according to embodiments.

The transmission device 10000 of FIG. 1, the point cloud video encoder 10002 of FIG. 1, the encoding 20001 of FIG. 2, the encoder of FIG. 4, the transmission device of FIG. 12, the XR device 1430 of FIG. 14, the attribute encoder of FIG. 30, the flowchart of FIG. 32, the flowchart of FIGS. 33 and 34, and the like may encode point cloud data based on based on the attribute difference estimation of FIG. 18.

The reception device 10004 of FIG. 1, the point cloud video decoder 10006 of FIG. 1, the decoding 20003 of FIG. 2, the decoder of FIGS. 10 and 11, the reception device of FIG. 13, the XR device 1430 of FIG. 14, the attribute decoder of FIG. 31, and the flowchart of FIG. 35, and the like may decode the point cloud data based on the attribute difference estimation of FIG. 18.

Attribute Difference Estimation

Attribute similarity may be determined by comparing matching attributes of points. For example, when the attribute of the n-th point P(n) is a(n), the color and reflectance may be defined as shown in 18000.

Two points may be compared in terms of attribute similarity as shown in 18010, where w may denote a weight for each component, and may be used to assign a greater weight to the main component.

As shown in FIG. 18, the method/device according to the embodiments may estimate the similarity between two points based on an L1 norm, an L2 norm, a distance, a ratio, and the like obtained from the attributes (color, reflectance, etc.) of the two point.

The embodiments illustrate a case where attribute similarity related comparison is performed based on the correlation between color and reflectance. Color and reflectance may be considered independently, or different methods for each of color and reflectance may be used in combination. In addition, RGB may be considered for the color. Alternatively, conversion to a color domain such as YCbCr may be considered in order to reduce dependence between color channels and increase linearity between color components.

The method/device according to embodiments may perform operations of 1) correlated point estimation and 2) correlated point-based attribute difference estimation to search for neighbor points in consideration of attribute similarity.

FIG. 19 illustrates estimation of a correlated point according to embodiments.

The transmission device 10000 of FIG. 1, the point cloud video encoder 10002 of FIG. 1, the encoding 20001 of FIG. 2, the encoder of FIG. 4, the transmission device of FIG. 12, the XR device 1430 of FIG. 14, the attribute encoder of FIG. 30, the flowchart of FIG. 32, the flowchart of FIGS. 33 and 34, and the like may encode point cloud data based on the correlated point estimation in FIG. 19.

The reception device 10004 of FIG. 1, the point cloud video decoder 10006 of FIG. 1, the decoding 20003 of FIG. 2, the decoder of FIGS. 10 and 11, the reception device of FIG. 13, the XR device 1430 of FIG. 14, the attribute decoder of FIG. 31, and the flowchart of FIG. 35, and the like may decode the point cloud data based on the correlated point estimation in FIG. 19.

In order to find neighbor points in terms of attributes based on the above geometry and/or attributes, information on the attribute of the current point and the attributes of neighbor nodes is required. However, since the information on the attribute of the current point is not available in the operations of attribute compression and reconstruction, it is necessary to estimate the attributes of the current point and a target point. That is, during encoding/decoding, it is difficult to identify the attribute from the perspective of the current point while the distance of the current point may be identified.

A nearest neighbor may be searched for accurately and efficiently through a correlated point that is close in terms of both distance and attribute. Compared to the distance-based nearest neighbor, the issue of a difference in attribute that occurs in the data boundary area may be addressed efficiently and accurately.

In this case, in using decoded attribute information about a target point, reconstructed attribute information matched to the position of each point may be used. For example, in LoD-based attribute compression, a point belonging to a previous LoD or a point that is included in the current LoD but has an attribute reconstructed prior to that of the current point may be considered as the target.

However, since the attribute of the current point has not been reconstructed yet, the attribute of the current point may be estimated based on the attributes of points similar to the current point. For example, when the LoD-based attribute compression method is used, the attribute of a point closer to the current point in terms of distance among the points belonging to the previous LoD or the points that are included in the current LoD but have attributes reconstructed prior to the attribute of the current point may be used. That is, the attribute A(n) of the n-th point may be approximated as 1) the attribute A(k) of the k-th point positioned at the closest distance among the target points (19000).

Alternatively, it may be approximated as 2) the average of the attributes of position-based adjacent points among the target points (19010).

It may be approximated using 3) a parent-child relationship in the octree structure (19020). For example, in the case of scalable lifting, in configuring LoDs, a higher LoD is configured by selecting one of the points that share a parent. In this case, the parent may represent the children and the attribute thereof may be considered as an approximation of the attributes of the children.

When M(n) is a Morton code of P(n), the parent may be defined as the equation 19030 (19030).

Here, P(n) and P(k) may be defined to belong to different LoDs.

FIG. 20 illustrates estimation of an attribute difference based on a correlated point according to embodiments.

The transmission device 10000 of FIG. 1, the point cloud video encoder 10002 of FIG. 1, the encoding 20001 of FIG. 2, the encoder of FIG. 4, the transmission device of FIG. 12, the XR device 1430 of FIG. 14, the attribute encoder of FIG. 30, the flowchart of FIG. 32, the flowchart of FIGS. 33 and 34, and the like may encode point cloud data based on the correlated point and attribute difference in FIG. 20.

The reception device 10004 of FIG. 1, the point cloud video decoder 10006 of FIG. 1, the decoding 20003 of FIG. 2, the decoder of FIGS. 10 and 11, the reception device of FIG. 13, the XR device 1430 of FIG. 14, the attribute decoder of FIG. 31, and the flowchart of FIG. 35, and the like may decode the point cloud data based on the correlated point and attribute difference in FIG. 20.

Based on the geometry/attribute distance and the correlated point defined above, a difference from a neighbor point may be obtained considering the position and attribute similarities.

FIG. 20 shows that an attribute difference is obtained based on a point to be compressed (current point) and a nearest point (correlated point) with respect to a neighbor point. Based on the definition of the correlated point described above, the attribute of a point estimated to be most similar to the attribute at the position of the current point. FIG. 20 illustrates a case where the attribute of the point nearest the position of the current point among the points belonging to the previous LoD/layer. In this case, difference in attribute from the neighbor point may be directly calculated, considering the nearest point as a correlated point for the current point.

That is, the difference between the attribute of the correlated point and the attribute of the neighbor point is assumed as an approximate value of the difference between the attribute of the current point and the attribute of the neighbor point (20000).

In FIG. 20, each circle indicates presence of a point, and distinct circles 20010, 20020, and 20030 represent points belonging to different LoD/Layer. In addition, a circle with a solid line represents a point whose attribute has been reconstructed, and a circle with a dotted line represents a point whose attribute has not been reconstructed.

FIG. 21 illustrates estimation of a parent-child-based correlated point.

The transmission device 10000 of FIG. 1, the point cloud video encoder 10002 of FIG. 1, the encoding 20001 of FIG. 2, the encoder of FIG. 4, the transmission device of FIG. 12, the XR device 1430 of FIG. 14, the attribute encoder of FIG. 30, the flowchart of FIG. 32, the flowchart of FIGS. 33 and 34, and the like may configure correlated points based on the parent-child relationship of FIG. 21 and encode point cloud data.

The reception device 10004 of FIG. 1, the point cloud video decoder 10006 of FIG. 1, the decoding 20003 of FIG. 2, the decoder of FIGS. 10 and 11, the reception device of FIG. 13, the XR device 1430 of FIG. 14, the attribute decoder of FIG. 31, and the flowchart of FIG. 35, and the like may configure correlated points based on the parent-child relationship of FIG. 21 and decode the point cloud data.

In the case where points are layered hierarchically based on an octree structure, for example, in the case of scalable lifting, a correlated point may be defined based on a parent-child relationship between points. In this case, assuming that the attributes of a higher layer may be pre-identified (for example, assuming that the receiver completes the reconstruction first for a higher LoD), it is assumed that the attribute of the parent represents the attributes of the children. In reality, the degree of similarity between the two points may be high. Even for a neighbor point, the parent of the neighbor point may be defined as a correlated point based on the same assumption. In this case, as shown in FIG. 21, attribute similarity may be identified by comparing the attributes of the parent of the current point and the parent of the neighbor point.

FIG. 22 illustrates a neighbor point-based estimation of an attribute difference according to embodiments.

The reception device 10004 of FIG. 1, the point cloud video decoder 10006 of FIG. 1, the decoding 20003 of FIG. 2, the decoder of FIGS. 10 and 11, the reception device of FIG. 13, the XR device 1430 of FIG. 14, the attribute decoder of FIG. 31, and the flowchart of FIG. 35, and the like may estimate the attribute difference based on neighbor points as shown in FIG. 22, and encode point cloud data.

The reception device 10004 of FIG. 1, the point cloud video decoder 10006 of FIG. 1, the decoding 20003 of FIG. 2, the decoder of FIGS. 10 and 11, the reception device of FIG. 13, the XR device 1430 of FIG. 14, the attribute decoder of FIG. 31, and the flowchart of FIG. 35, and the like may estimate the attribute difference based on neighbor points as shown in FIG. 22, and decode the point cloud data.

When the reconstruction of the attribute of a neighbor point is completed, the attribute difference may be obtained directly using the attribute of the neighbor point as shown in FIG. 22. When necessary, whether to use the actual attribute of the neighbor point may be signaled.

FIG. 23 illustrates a neighbor search based on geometry and attributes according to embodiments.

The transmission device 10000 of FIG. 1, the point cloud video encoder 10002 of FIG. 1, the encoding 20001 of FIG. 2, the encoder of FIG. 4, the transmission device of FIG. 12, the XR device 1430 of FIG. 14, the attribute encoder of FIG. 30, the flowchart of FIG. 32, the flowchart of FIGS. 33 and 34, and the like may search for neighbor points based on geometry and attributes to encode point cloud data, as shown in FIG. 23.

The reception device 10004 of FIG. 1, the point cloud video decoder 10006 of FIG. 1, the decoding 20003 of FIG. 2, the decoder of FIGS. 10 and 11, the reception device of FIG. 13, the XR device 1430 of FIG. 14, the attribute decoder of FIG. 31, and the flowchart of FIG. 35, and the like may search for neighbor points based on the geometry and attributes to decode the point cloud data, as shown in FIG. 23.

Geom-Attr Based Neighbor Search

In order to determine whether points are adjacent to each other, the geometry/attribute distance and the correlated point defined above may be used. That is, in addition to determining point adjacency based on the distance in the embodiment, attribute adjacency may be simultaneously considered, and adjacency of points may be determined based on ascending order of error/difference between the points. Accordingly, efficient and accurate compression/reconstruction may be implemented by determining neighbor points in consideration of attribute similarity.

A difference from a neighbor node may be obtained based on a geometry/attribute distance and a correlated point in consideration of position and attribute similarities. FIG. 23 illustrates obtaining a position and attribute difference from a neighbor point based on a point to be compressed (current point) and the nearest point (correlated point). Since the current point has position information (geometry), a geometry distance between the current point and the neighbor point may be used to obtain a position distance from the neighbor point. In the case of an attribute, since the attribute of the current point is not given in compression/reconstruction, an attribute distance between a correlated point and a neighbor point may be used. This is because the attribute of the current point may be similar to the attribute of the correlated point.

Figure 24:
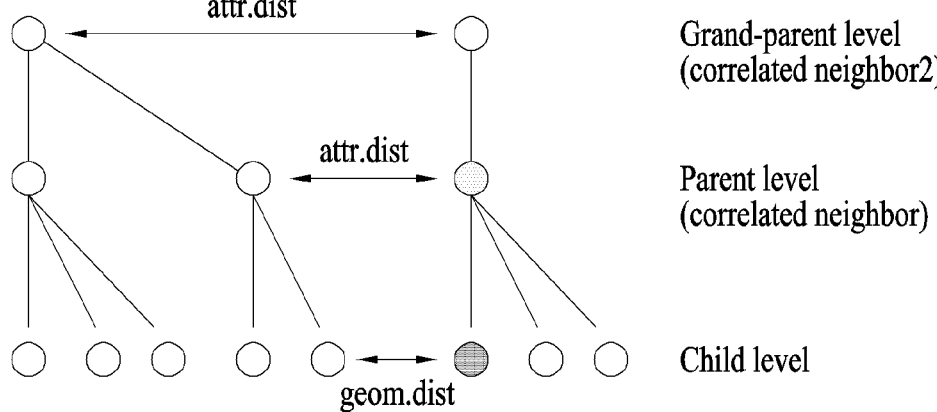
FIG. 24 illustrates estimation of an attribute difference using a parent-child-based correlation point according to embodiments.

FIG. 24 illustrates estimation of an attribute difference using a parent-child-based correlation point according to embodiments.

The transmission device 10000 of FIG. 1, the point cloud video encoder 10002 of FIG. 1, the encoding 20001 of FIG. 2, the encoder of FIG. 4, the transmission device of FIG. 12, the XR device 1430 of FIG. 14, the attribute encoder of FIG. 30, the flowchart of FIG. 32, the flowchart of FIGS. 33 and 34, and the like may estimate an attribute difference based on a parent-child based correlated point and encode point cloud data, as shown in FIG. 24.

The reception device 10004 of FIG. 1, the point cloud video decoder 10006 of FIG. 1, the decoding 20003 of FIG. 2, the decoder of FIGS. 10 and 11, the reception device of FIG. 13, the XR device 1430 of FIG. 14, the attribute decoder of FIG. 31, and the flowchart of FIG. 35, and the like may estimate an attribute difference based on a parent-child based correlated point and decode the point cloud data, as shown in FIG. 24.

In the case where points are layered hierarchically based on an octree structure, for example, in the case of scalable lifting, a correlated point may be defined based on a parent-child relationship between points. When necessary, a related point at a higher level, such as a grandparent, may be defined as a correlated neighbor according to an application field to obtain an attribute difference.

In order to search for a neighbor point, the method/device according to the embodiments may perform determination 1) by considering a weight for the sum of errors, and/or 2) based on a threshold.

FIG. 25 illustrates an example of using a weight to obtain the sum of errors according to embodiments.

FIG. 26 illustrates an example of using a threshold according to embodiments.

The transmission device 10000 of FIG. 1, the point cloud video encoder 10002 of FIG. 1, the encoding 20001 of FIG. 2, the encoder of FIG. 4, the transmission device of FIG. 12, the XR device 1430 of FIG. 14, the attribute encoder of FIG. 30, the flowchart of FIG. 32, the flowchart of FIGS. 33 and 34, and the like may search for neighbor points to encode point cloud data, as shown in FIGS. 25 and 26.

The reception device 10004 of FIG. 1, the point cloud video decoder 10006 of FIG. 1, the decoding 20003 of FIG. 2, the decoder of FIGS. 10 and 11, the reception device of FIG. 13, the XR device 1430 of FIG. 14, the attribute decoder of FIG. 31, and the flowchart of FIG. 35, and the like may search for neighbor points to decode the point cloud data, as shown in FIGS. 25 and 26.

Weighting the Sum of Errors

For the n-th point P(n), when the position and attribute differences are considered based on corresponding weights, the difference between points may be defined as the weighted sum of the position difference and the attribute difference as follows. The weights wg and wa may serve to determine the weight of the position and attribute (25000).

In this regard, different error measurement methods may be used for the position error E_g and the attribute error E_a (25010). For example, the L2 norm related equation of 17010 may be used for the position, and the ratio related equation of 18010 may be used for the attribute. Alternatively, the L1 norm and L2 norm may be used differently. For the position error, a Euclidean distance-based error may be used. For the attribute error, a Euclidean distance in the color space may be obtained or the color difference in a uniform color space (e.g., CIELa*b*), such as deltaE, may be measured.

A point with the smallest difference E between points in a group that is a target of a neighbor may be the nearest neighbor of the current point. In addition, when N neighbors are searched for, points may be arranged according to the size of the difference E between the points, and then N points may be selected in ascending order of E.

Threshold

When the difference between points is included in a specific range based on a threshold, the point may be selected to be a neighbor. For example, N points may be selected in ascending order of distance from among points whose attribute differences fall within a specific range (26000).

Figure 27:
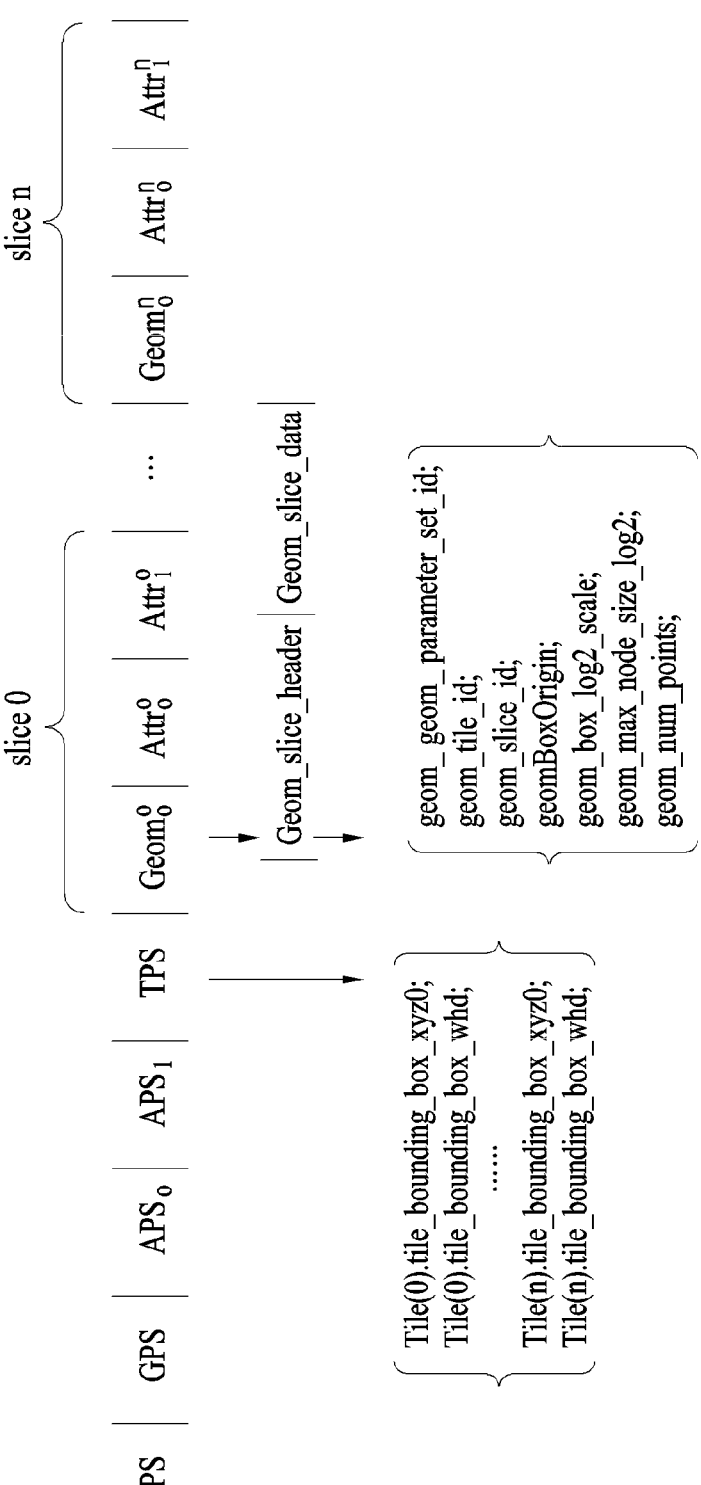
FIG. 27 illustrates an example of a bitstream containing point cloud data according to embodiments.

FIG. 27 illustrates an example of a bitstream containing point cloud data according to embodiments.

The transmission device 10000 of FIG. 1, the point cloud video encoder 10002 of FIG. 1, the encoding 20001 of FIG. 2, the encoder of FIG. 4, the transmission device of FIG. 12, the XR device 1430 of FIG. 14, the attribute encoder of FIG. 30, the flowchart of FIG. 32, the flowchart of FIGS. 33 and 34, and the like may generate a bitstream containing point cloud data and parameters related to the point cloud data as shown in FIG. 27.

The reception device 10004 of FIG. 1, the point cloud video decoder 10006 of FIG. 1, the decoding 20003 of FIG. 2, the decoder of FIGS. 10 and 11, the reception device of FIG. 13, the XR device 1430 of FIG. 14, the attribute decoder of FIG. 31, and the flowchart of FIG. 35, and the like may receive a bitstream containing point cloud data and parameters related to the point cloud data as shown in FIG. 27.

As an embodiment of the present disclosure, information related to LoD generation may be defined in the parameter set and attribute slice header as follows. Depending on the application or system, the information may be defined in a corresponding position or a separate position to use a different range and application method. While the information is described in this embodiment as being defined in the attribute parameter set and attribute slice header, it may be defined in the geometry parameter set and geometry slice header so as to be associated with the geometry coding method or applied to geometry coding, or may be defined in the sequence parameter set, tile parameter set, or the like. In addition, when the syntax element defined below is applicable to multiple point cloud data streams as well as the current point cloud data stream, the information may be transmitted through a higher-level parameter set.

Signaling information according to embodiments may be generated in the compression (encoding) operation of a (scalable) point cloud compression transmission device/method, and may be used in the decoding operation of a (scalable) point cloud compression/reception device/method.

In the following description, parameters (which may be referred to as various terms such as metadata and signaling information) according to embodiments may be generated in a process of a transmitter according to embodiments, and may be transmitted to a receiver according to the embodiments so as to be used in the reconstruction operation. For example, the parameters according to the embodiments may be generated by the metadata processor (or metadata generator) of the transmission device according to the embodiments and acquired by the metadata parser of the reception device according to the embodiments.

Each abbreviation stands for: SPS: Sequence Parameter Set; GPS: Geometry Parameter Set; APS: Attribute Parameter Set; TPS: Tile Parameter Set; Geom: Geometry bitstream=geometry slice header+geometry slice data; Attr: Attribute bitstream=attribute slice header+attribute attribute slice data. A slice may be referred to as a data unit.

A point cloud data encoder, a transmission device, or the like according to embodiments may generate signaling information about operations according to embodiments, and may generate and transmit a bitstream containing the point cloud data.

A point cloud data decoder, a reception device, or the like according to embodiments may receive a bitstream and reconstruct point cloud data based on the parameter(s) contained in the bitstream.

FIG. 28 shows an attribute parameter set according to embodiments.

FIG. 28 shows the attribute parameter set of FIG. 27.

FIG. 29 shows an attribute slice header according to embodiments.

FIG. 29 shows the attribute slice header of FIG. 27.

The parameters included in FIGS. 28 and 29 are defined as follows.

neighbor_search_attr_correlation_enabled_flag: When set to 1, it may indicate that neighbor search based on attribute similarity is used. When it is set to 0, it may indicate that attribute similarity is not used in performing neighbor search, and the neighbor search may be performed based only on position similarity.

attr_correlation_type: may indicate a reference for determining attribute similarity. When set to 0, it may indicate that attribute similarity is determined based on a threshold (e.g., FIG. 26). When set to 1, it may indicate that attribute similarity is determined based on a weight (e.g., FIG. 25).

th1_lower_bound and th2_upper_bound: May indicate a range when attr_correlation_type is 0. When the attribute difference is greater than or equal to th1_lower_bound and less than or equal to th2_upper_bound, it may be determined that the corresponding point is similar in attribute to the current point (see FIG. 26).

weight_geom, weight_attr1, and weight_attr2: When attr_correlation_type is 1, may indicate weights for considering different differences (e.g., Ea, Eg, etc.). The weight for the position difference may be signaled as weight_geom, the weight for attribute 1 as weight_attr1, and the weight for attribute 2 as weight_attr2. The number of weights may increase according to the types of differences to be considered.

FIG. 30 illustrates a point cloud data encoder according to embodiments.

FIG. 30 may correspond to the transmission device 10000 of FIG. 1, the point cloud video encoder 10002, the encoding 20001 of FIG. 2, the encoder of FIG. 4, the attribute encoder of FIG. 4, the transmission device of FIG. 12, the attribute encoder of FIG. 12, the XR device 1430 of FIG. 14, the point cloud data encoding of FIGS. 16 to 26, the bitstream generation of FIG. 27, the parameter generation of FIGS. 28 and 29, and the operation of FIG. 32.

The operations of the above-described embodiments may be performed through components of a prediction-based point cloud compression transmission/reception device/method according to embodiments described below. Each component according to the embodiment may correspond to hardware, software, a processor, and/or a combination thereof.

The point cloud attribute compression method proposed in the present disclosure may be implemented as follows. In this embodiment, the method of compressing attribute information of point cloud data is described. It should be noted that the method described in the present disclosure is applicable to position information compression and other compression methods.

A point cloud encoder, for example, an attribute encoder, of the transmission device according to the embodiments may be configured and/or operated as described below.

FIG. 30 illustrates an embodiment of a transmitter for attribute compression implementing the method for searching for a neighbor node based on position similarity and attribute similarity. Based on the position information, points are divided into layers according to LoDs and grouped, and then neighbor nodes are searched for based on the LoDs.

When neighbour_search_att_correlation_enabled_flag is 1, attribute information as well as the position may be considered according to embodiments. Depending on the method considered, attr_correlation_type) may be included as a parameter in the bitstream of FIG. 27 and transmitted.

In addition, related parameters may be transmitted according to attr_correlation_type. For example, th1_lower_bound, th2_upper_bound, weight_geom, weight_attr1, weight_attr2, and the like may be included in the bitstream as shown in FIGS. 27 to 29.

Neighbor points may be searched for in terms of position and attributes, and attribute compression, transformation, quantization, and entropy coding may be performed based thereon to generate a bitstream (FIGS. 27 to 29).

An LOD generator receives attribute data and/or geometry data of the point cloud data. The LOD generator may present the point cloud data in an LOD structure.

A geometry-attribute NN searcher may search for a nearest neighbor (NN) for encoding the current point cloud data based on the geometry and/or attributes.

An attribute predictor may generate predicted attribute data for current point cloud data based on the NN.

A transform and quantization unit may transform and quantize the predicted data.

An inverse quantization unit may inversely quantize the quantized predicted data and provide the same to the geometry-attribute NN searcher.

An entropy coder may generate and encode a residual between the point cloud data and the predicted point cloud data, and encode the predicted data based on the entropy method. An encoded attribute bitstream may be generated.

FIG. 31 illustrates a point cloud data decoder according to embodiments.

FIG. 31 may correspond to the reception device 10004 of FIG. 1, the point cloud video decoder 10006 of FIG. 1, the decoding 20003 of FIG. 2, the decoder of FIGS. 10 and 11, the reception device of FIG. 13, the XR device 1430 of FIG. 14, the decoding of point cloud data based on FIGS. 16 to 26, use of the parameter information included in the bitstream in FIGS. 27 to 29, the reverse process of the encoder of FIG. 30, the operation of FIG. 35, and the like.

FIG. 31 illustrates an embodiment of a receiver for implementing the method for searching for neighbor nodes based on position similarity and attribute similarity. When neighbor_search_att_correlation_enabled_flag is 1, LoD may be generated based on the reconstructed position information, and then neighbor search may be performed based on the attribute similarity. In this case, as a method of determining attribute similarity according to attr_correlation_type, one of configured methods such as thresholding or weighted sum of errors may be used. The point cloud data may be reconstructed by performing attribute reconstruction based on the neighbor nodes identified based on the position and attribute information.

FIGS. 30 and 31 and each of the components corresponding to FIGS. 30 and 31 may correspond to hardware, software, a processor, and/or a combination thereof.

An entropy decoder may receive an attribute bitstream.

An inverse quantization and transform unit may inversely quantize and transform attribute data.

An LOD generator may present point cloud data in an LOD structure based on the attribute data and/or the geometry data.

A geometry-attribute NN searcher may search for the NN for current point cloud data based on the geometry and/or the attributes. The operation of the geometry-attribute NN searcher may follow the description of FIG. 32.

An attribute reconstructor may reconstruct the point cloud data by adding the predicted value generated based on the NN and the received residual. Reconstructed attribute data may be generated.

FIG. 32 illustrates a point cloud data encoding method according to embodiments.

The flowchart of FIG. 32 is implemented by a method/ device or the like according to FIG. 30 and the embodiments corresponding to FIG. 30.

FIG. 32 shows an embodiment of a flowchart of a method of searching for a neighbor point based on the position and attributes.

According to embodiments, in a method of searching for a position-based neighbor point, a position difference may be obtained, and N points having a small position difference may be searched for based on the position difference.

Furthermore, according to the embodiments, a neighbor point or the parent point whose attribute is estimated to have a similar attribute to the reconstruction target point may be selected as a correlated point in order to consider not only the geometry (position) but also the attribute difference, and then the attribute difference may be obtained based thereon. In obtaining the attribute difference, points belonging to the previous LoD and attribute information that is previously reconstructed while belonging to the current LoD may be used together. Based on the obtained position and attribute difference, a neighbor node may be searched for according to attr_correlation_type.

A method/device according to embodiments receives point cloud data included in one or more LODs.

The method/device according to the embodiments estimates a geometry (position) distance (see FIG. 17, etc.).

The method/device according to the embodiments estimates a correlated point (see FIG. 19, etc.).

The method/device according to the embodiments estimates an attribute distance based on previously reconstructed attribute data included in LOD N−1 and LOD N (see FIGS. 18, 20 to 22, etc.).

The method/device according to the embodiments searches for a nearest neighbor for current point cloud data based on the geometry and/or attribute (see FIG. 23, etc.).

In the flowchart of FIG. 32, Geom. dist. estimation may include contents described in relation to geometry difference estimation. According to embodiments, it may not necessarily be performed. For example, when a correlated point is defined based on the parent-child relationship in the octree, geom. dist. may be inferred. This operation may also be seen as geom. dist. estimation in a broad sense.

In order to search for a correlated point according to embodiments, 1) a nearest distance, 2) an average, or 3) the parent-child relationship may be used. In this regard, the calculated geom. dist. estimation result may be used.

In performing geom-attr based neighbor search, a position/attribute difference E may be calculated, where E may be generated through equations according to embodiments in geom. dist. estimation and attr. difference estimation.

FIG. 33 illustrates a point cloud data encoding method according to embodiments.

FIG. 33 is an embodiment of a detailed flowchart for the geom-attr based neighbor search of FIG. 32. Regarding an attribute-based selection method, (a) illustrates weight sum-based selection according to embodiments and (b) illustrates threshold-based selection according to embodiments.

(a): One distance is calculated by combining the position difference and the attribute difference based on weights. When the distance is less than the max neighb dist, which is the maximum distance in a set of preselected neighbors, it may replace the neighbor with the maximum value and be inserted to the neighbor set. This process may be performed recursively for neighbor candidates.

(b): A position difference and an attribute difference may be selected successively. According to embodiments, the position selection may be followed by the attribute selection. However, depending on application fields, the attribute selection may be followed by the position selection. In the case where the selection is performed based on the position difference, when the distance is less than the max geom dist, which is the maximum distance in a set of N neighbors in ascending order of the geom dist based on the position difference, the neighbor may replace the neighbor with the maximum value and be inserted to the neighbor set.

For a node whose position distance is less than the existing max geom dist, when the attribute falls within the range set by a threshold, the node may be selected as an actual neighbor and inserted to the neighbor set. When the attribute difference is out of a specific range, even a point that is at a short distance in terms of the position difference is not inserted to the neighbor set. Depending on the application field, a fixed weight may be used for the max geom distance (max geom dist) or threshold 1 and threshold 2 (th1 and th2) may be used as variable functions.

FIG. 34 illustrates a method of transmitting point cloud data according to embodiments.

S3400: The point cloud data transmission method according to the embodiments may include encoding point cloud data.

The encoding operation according to the embodiments may include the operations of the transmission device 10000, the point cloud video encoder 10002 of FIG. 1, the encoding 20001 of FIG. 2, the encoder of FIG. 4, the attribute encoder of FIG. 4, the transmission device of FIG. 12, the attribute encoder of FIG. 12, the XR device 1430 of FIG. 14, the point cloud data encoding of FIGS. 16-26, the bitstream generation of FIG. 27, the parameter generation of FIGS. 28 and 29, and the operations of FIGS. 32 and 33.

S3401: The point cloud data transmission method according to the embodiments may further include transmitting a bitstream containing the point cloud data.

The transmission operation according to the embodiments may include the operations of the transmission device 10000, the point cloud video encoder 10002 of FIG. 1, the encoding 20001 of FIG. 2, the encoder of FIG. 4, the attribute encoder of FIG. 4, the transmission device of FIG. 12, the attribute encoder of FIG. 12, the XR device 1430 of FIG. 14, and the transmission of the bitstream of FIG. 27.

FIG. 35 illustrates a method of receiving point cloud data according to embodiments.

S3500: The point cloud data reception method according to the embodiments may include receiving a bitstream containing point cloud data.

The reception operation according to the embodiments may include the operations of the reception device 10004, the point cloud video decoder 10006 of FIG. 1, the decoding 20003 of FIG. 2, the decoder of FIGS. 10 and 11, the reception device of FIG. 13, the XR device 1430 of FIG. 14, and the reception of the bitstream of FIGS. 27 to 29.

S3010, The point cloud data reception method according to the embodiments may include decoding the point cloud data.

The decoding operation according to the embodiments may include the operations of the reception device 10004, the point cloud video decoder 10006 of FIG. 1, the decoding 20003 of FIG. 2, the decoder of FIGS. 10 and 11, the reception device of FIG. 13, and the XR device 1430 of FIG. 14, decoding of the point cloud data based on FIGS. 16 to 26, and decoding of the bitstream of FIGS. 27 to 29.

A point cloud data transmission method according to embodiments may include encoding point cloud data, and transmitting a bitstream containing the point cloud data. The encoding of the point cloud data may include encoding geometry data of the point cloud data, and encoding attribute data of the point cloud data. The encoding of the attribute data may include generating a level of detail (LOD) related to the point cloud data, searching for a nearest neighbor for the point cloud data based on at least one of the geometry data and/or the attribute data, and generating predicted data for the attribute data.

The searching for the nearest neighbor may include generating a value related to distance similarity between the point cloud data, generating a correlated point for the point cloud data, and generating a value related to attribute similarity between the point cloud data.

The correlated point according to the embodiments may be obtained from a point at a short distance from a point included in the LOD. Alternatively, the correlated point may be obtained based on an average of points neighboring the point cloud data. Alternatively, the correlated point may be obtained based on a higher node included in an octree for the point cloud data. In addition, an attribute difference between the correlated point and neighbor points neighboring the point cloud data may be generated based on the value related to the distance similarity, the value related to the attribute similarity, and the correlated point.

In the point cloud data transmission method according to the embodiments, a geometry difference between the point cloud data and a neighbor point neighboring the point cloud data may be generated, and an attribute difference between the correlated point and the neighbor point may be generated.

In the point cloud data transmission method according to the embodiments, a difference between the point cloud data may be generated based on the geometry difference value, the attribute difference, and a weight, and generate the nearest neighbor based on the difference.

A device for receiving point cloud data according to embodiments may include a receiver configured to receive a bitstream containing point cloud data; and a decoder configured to decode the point cloud data.

The decoder configured to decode the may include a geometry decoder configured to decode geometry data of the point cloud data, and an attribute decoder configured to decode attribute data of the point cloud data. The the attribute decoder may be configured to generate a level of detail (LOD) related to the point cloud data, search for a nearest neighbor for the point cloud data based on at least one of the geometry data or the attribute data, and generate predicted data for the attribute data.

Accordingly, the point cloud data transmission method/ device according to the embodiments may efficiently compress attribute data and address the issue of inefficiency resulting from significant deterioration of neighbor similarity in a data edge region, thereby increasing compression performance through similarity-based compression with high accuracy. Therefore, the point cloud data reception method/device according to the embodiments may accurately reconstruct the efficiently compressed point cloud data.

The embodiments have been described in terms of a method and/or a device. The description of the method and the description of the device may complement each other.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/ methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

Mode for Disclosure

As described above, related details have been described in the best mode for carrying out the embodiments.

INDUSTRIAL APPLICABILITY

As described above, the embodiments are fully or partially applicable to a point cloud transmission/reception device and system.

Those skilled in the art may change or modify the embodiments in various ways within the scope of the embodiments.

Embodiments may include variations/modifications within the scope of the claims and their equivalents.

The invention claimed is:

1. A method comprising:
encoding geometry data of point cloud data based on an octree; and
encoding attribute data of the point cloud data, wherein the encoding attribute data includes:
generating Levels of Detail (LoDs) for the geometry data; and
generating a set of closest neighbor points for a point in a level of the LoDs based on an overall distance between the point and a closest neighbor point of the set of closest neighbor points,
wherein the overall distance is generated based on:
a geometry distance generated based on a difference between a reconstructed position of the point and a reconstructed position of the closest neighbor point; and
an attribute distance generated based on a sum of absolute differences, wherein each of the absolute differences is generated between a reconstructed attribute value for the point and a reconstructed attribute value of the closest neighbor point for each of a plurality of attributes for the point.

2. The method of claim 1,
wherein the overall distance is generated based on a weighted sum of the geometry distance multiplied by a first weight and the attribute distance multiplied by a second weight.

3. The method of claim 1,
wherein the set of closest neighbor points is generated based on:
whether the overall distance is within a threshold; or
whether the attribute distance is within the threshold.

4. The method of claim 1,
wherein the reconstructed attribute value for the point is an attribute value of a correlated point, and wherein the attribute value of the correlated point is generated based on:
an attribute value of a parent node of the point in the octree;
an attribute value of a previously reconstructed point having a minimum geometry distance to the point; or
an average of attribute values of a plurality of previously reconstructed points adjacent to the point.

5. The method of claim 1,
wherein the reconstructed attribute value for the point is an attribute value of a correlated point, and wherein the attribute value of the correlated point is generated based on an attribute value of a parent node of the point in the octree, and
wherein the attribute distance is generated between the attribute value of the parent node of the point and an attribute value of the parent node of the closest neighbor point.

6. A method comprising:
decoding geometry data of point cloud data in a bitstream based on an octree; and
decoding attribute data of the point cloud data in the bitstream,
wherein the decoding attribute data includes:
generating Levels of Detail (LoDs) for the geometry data; and
obtaining a set of closest neighbor points for a point in a level of the LoDs, based on an overall distance between the point and a closest neighbor point of the set of closest neighbor points,
wherein the overall distance is obtained based on:
a geometry distance obtained based on a difference between a decoded position of the point and a decoded position of the closest neighbor point; and
an attribute distance obtained based on a sum of absolute differences, wherein each of the absolute differences is obtained between a decoded attribute value for the point and a decoded attribute value of the closest neighbor point for each of a plurality of attributes for the point.

7. The method of claim 6,
wherein the overall distance is obtained based on a weighted sum of the geometry distance multiplied by a first weight and the attribute distance multiplied by a second weight.

8. The method of claim 6,
wherein the set of closest neighbor points is obtained from the neighbor points based on:
whether the overall distance is within a threshold; or
whether the attribute distance is within the threshold.

9. The method of claim 6,
wherein the decoded attribute value for the point is an attribute of a correlated point, and wherein the attribute value of the correlated point is generated based on:
an attribute value of a parent node of the point in the octree;
an attribute value of a previously decoded point having a minimum geometry distance to the point; or
an average of attribute values of a plurality of previously decoded points adjacent to the point.

10. The method of claim 6,
wherein the decoded attribute value for the point is an attribute value of a correlated point, and wherein the attribute value of the correlated point is obtained based on an attribute value of a parent node of the point in the octree, and
wherein the attribute distance is generated between the attribute value of the parent node of the point and an attribute value of the parent node of the closest neighbor point.

11. A device comprising:
a memory; and
at least one processor connected to the memory, wherein the at least one processor is configured to:
encode geometry data of point cloud data based on an octree;
encode attribute data of the point cloud data,
wherein the to encode attribute data, the at least one processor is further configured to:
generate Levels of Detail (LoDs) for the geometry data; and
generate a set of closest neighbor points for a point in a level of the LoDs based on an overall distance between the point and a closest neighbor point of the set of closest neighbor points,
wherein the overall distance is generated based on:
a geometry distance generated based on a difference between a reconstructed position of the point and a reconstructed position of the closest neighbor point; and
an attribute distance generated based on a sum of absolute differences, wherein each of the absolute differences is generated between a reconstructed attribute value for the point and a reconstructed attribute value of the closest neighbor point for each of a plurality of attributes for the point.

12. The device of claim 11,
wherein the overall distance is generated based on a weighted sum of the geometry distance multiplied by a first weight and the attribute distance multiplied by a second weight.

13. The device of claim 11,
wherein the set of closest neighbor points is generated based on:

whether the overall distance is within a threshold; or
whether the attribute distance is within the threshold.

14. The device of claim 11,
wherein the reconstructed attribute value for the point is an attribute value of a correlated point, and wherein the attribute value of the correlated point is generated based on:
an attribute value of a parent node of the point in the octree;
an attribute value of a previously reconstructed point having a minimum geometry distance to the point; or
an average of attribute values of a plurality of previously reconstructed points adjacent to the point.

15. The device of claim 11,
wherein the reconstructed attribute value for the point is an attribute value of a correlated point, and wherein the attribute value of the correlated point is generated based on an attribute value of a parent node of the point in the octree, and
wherein the attribute distance is generated between the attribute value of the parent node of the point and an attribute value of the parent node of the closest neighbor point.

16. A device comprising:
a memory; and
at least one processor connected to the memory, wherein the at least one processor is configured to:
decode geometry data of the point cloud data in a bitstream based on an octree; and
decode attribute data of the point cloud data in the bitstream,
wherein, the to decode attribute data, the at least one processor is further configured to:
generate Levels of Detail (LoDs) for the geometry data; and
obtain a set of closest neighbor points for a point in a level of the LoDs based on an overall distance between the point and a closest neighbor point of the set of closest neighbor points,
wherein the overall distance is obtained based on:
a geometry distance obtained based on a difference between a decoded position of the point and a reconstructed position of the closest neighbor point; and
an attribute distance obtained based on a sum of absolute differences, wherein each of the absolute differences is obtained between a decoded attribute value for the point and a decoded attribute value of the closest neighbor point for each of a plurality of attributes for the point.

17. The device of claim 16,
wherein the overall distance is obtained based on a weighted sum of the geometry distance multiplied by a first weight and the attribute distance multiplied by a second weight.

18. The device of claim 16,
wherein the set of closest neighbor points is obtained from the neighbor points based on:
whether the overall distance is within a threshold; or
whether the attribute distance is within the threshold.

19. The device of claim 16,
wherein the decoded attribute value for the point is an attribute value of a correlated point, and wherein the attribute value of the correlated point is generated based on:
an attribute value of a parent node of the point in the octree;

an attribute value of a previously decoded point having a minimum geometry distance to the point; or an average of attribute values of a plurality of previously decoded points adjacent to the point.

20. The device of claim 16, wherein the decoded attribute value for the point is an attribute value of a correlated point, and wherein the attribute value of the correlated point is generated based on an attribute value of a parent node of the point in the octree, and wherein the attribute distance is generated between the attribute value of the parent node of the point and an attribute value of the parent node of the closest neighbor point.

\* \* \* \* \*